United States Patent
Ozawa

(10) Patent No.: US 9,451,126 B2
(45) Date of Patent: Sep. 20, 2016

(54) TECHNIQUE FOR IMAGE PROCESSING

(71) Applicant: BROTHER KOGYO KABUSHIKI KAISHA, Nagoya, Aichi (JP)

(72) Inventor: Ryohei Ozawa, Nagoya (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

(21) Appl. No.: 14/662,317

(22) Filed: Mar. 19, 2015

(65) Prior Publication Data

US 2015/0281513 A1    Oct. 1, 2015

(30) Foreign Application Priority Data

Mar. 31, 2014   (JP) .................. 2014-071041

(51) Int. Cl.
*H04N 1/04*    (2006.01)
*H04N 1/387*   (2006.01)

(52) U.S. Cl.
CPC .......... *H04N 1/3878* (2013.01); *H04N 1/3876* (2013.01)

(58) Field of Classification Search
USPC ........................................ 358/1.9, 474, 461
See application file for complete search history.

(56) References Cited

U.S. PATENT DOCUMENTS 5,708,513 A    1/1998   Hasuo et al.
2009/0316996 A1*  12/2009  Yokoi .................. G06K 9/3283
                                                382/199

FOREIGN PATENT DOCUMENTS

| JP | H07-283933 A | 10/1995 |
| JP | 2000-187705 A | 7/2000 |
| JP | 2005057603 A | 3/2005 |

* cited by examiner

*Primary Examiner* — Houshang Safaipour
(74) *Attorney, Agent, or Firm* — Scully, Scott, Murphy & Presser, PC

(57) ABSTRACT

An image processing device may perform: obtaining first original image data generated by scanning a document including an object, the first original image data representing a first original image which includes a first object image indicating the object; detecting two or more straight lines in the first original image; specifying a first relationship between a first straight line among the two or more straight lines and the first object image; selecting, based on the first relationship, a particular straight line among the two or more straight lines; outputting, based on a direction in which the particular straight line extends, an output image represented by output data, the output data being generated by using the first original image data.

20 Claims, 13 Drawing Sheets

FIG. 6
(S48)
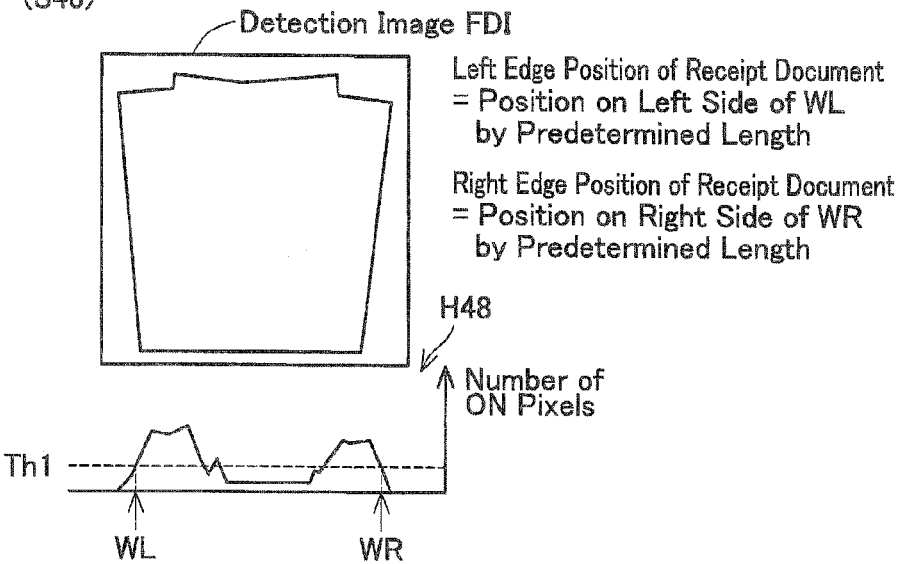
(S50)
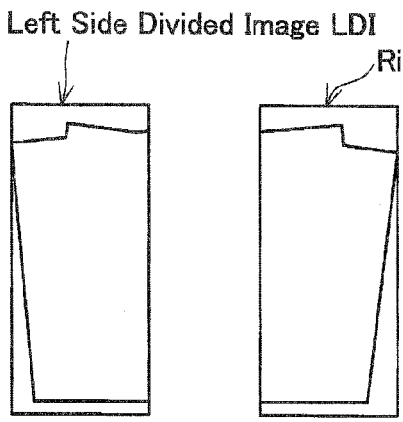
(S52)
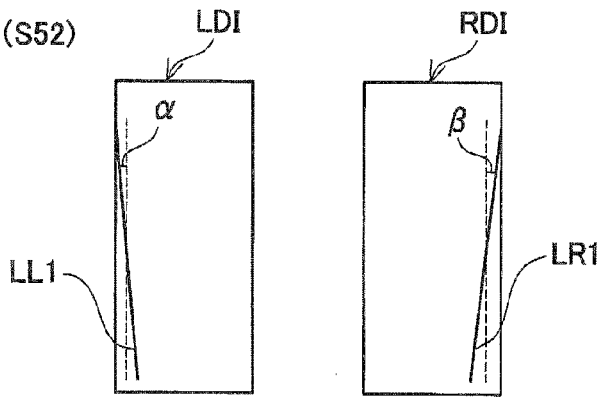

(S102~S106)

Front Surface Output Target Area FOA is Obtained by Expanding, by Predetermined Size, Rectangle Area Defined by WL1, WR1, HU1 and HL1

(S120)

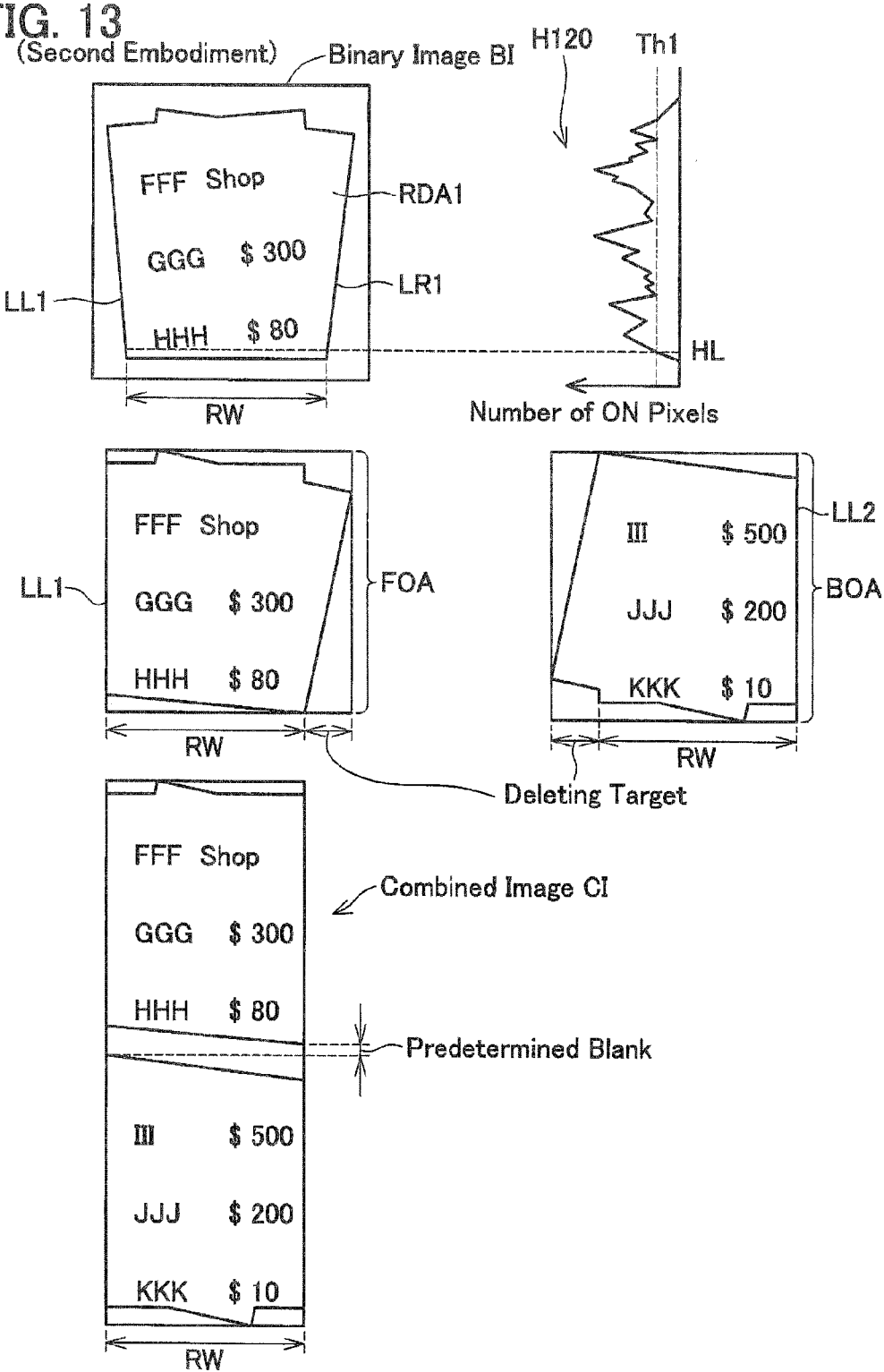

TECHNIQUE FOR IMAGE PROCESSING

CROSS-REFERENCE TO RELATED APPLICATION

This application claims priority to Japanese Patent Application No. 2014-071041, filed on Mar. 31, 2014, the contents of which are hereby incorporated by reference into the present application.

TECHNICAL FIELD

The present specification relates to an image processing device and a non-transitory computer-readable recording medium therefor.

DESCRIPTION OF RELATED ART

A technique is known that detects an inclination of a document image in a scan image, and corrects the inclination. In this technique, a binarization process and a noise deleting process are executed on the scan image, each unit configuring the document image is represented by the value "1", and each unit configuring background is represented by the value "0". Next, from among strings including the value "1", a string which has the shortest distance between the value "1" present at a leftmost side and the value "1" present at a rightmost side, and a string in which all the values are "1", are detected. Then, based on the two detected strings, the inclination of the document image is corrected.

SUMMARY

In the above technique, there is a possibility that the inclination of the document image is not corrected appropriately. Thus, there is a possibility that an output image is not output appropriately. In the present specification, a technique is provided which may allow output data to be generated appropriately by using original image data obtained by scanning a document including an object.

A non-transitory computer-readable recording medium taught in the present specification may store computer-readable instructions for an image processing device. The computer-readable instructions, when executed by a processor of the image processing device, may cause the image processing device to perform: obtaining first original image data generated by scanning a document including an object, the first original image data representing a first original image which includes a first object image indicating the object; detecting two or more straight lines in the first original image; specifying a first relationship between a first straight line among the two or more straight lines and the first object image; selecting, based on the first relationship, a particular straight line among the two or more straight lines; generating, based on a direction in which the particular straight line extends, output data by using the first original image data.

Further, in the present specification, a technique is provided which may allow an output image to be output appropriately by using original image data obtained by scanning a document including an object.

A non-transitory computer-readable recording medium taught in the present specification may store computer-readable instructions for an image processing device. The computer-readable instructions, when executed by a processor of the image processing device, may cause the image processing device to perform: obtaining first original image data generated by scanning a document including an object, the first original image data representing a first original image which includes a first object image indicating the object; detecting two or more straight lines in the first original image; specifying a first relationship between a first straight line among the two or more straight lines and the first object image; selecting, based on the first relationship, a particular straight line among the two or more straight lines; outputting, based on a direction in which the particular straight line extends, an output image represented by output data, the output data being generated by using the first original image data.

An image processing device comprising a processor and a memory that stores the computer-readable instructions described above therein is also novel and useful. Furthermore, a control method and computer-readable instructions for implementation of the image processing device is also novel and useful.

BRIEF DESCRIPTION OF THE DRAWINGS

FIG. 6 shows examples of a detection image and divided images generated in the straight line detecting process;

FIG. 13 is a diagram for describing an output process of a second embodiment.

EMBODIMENT (First Embodiment)
(Configuration of Communicating System 2)

Figure 1:
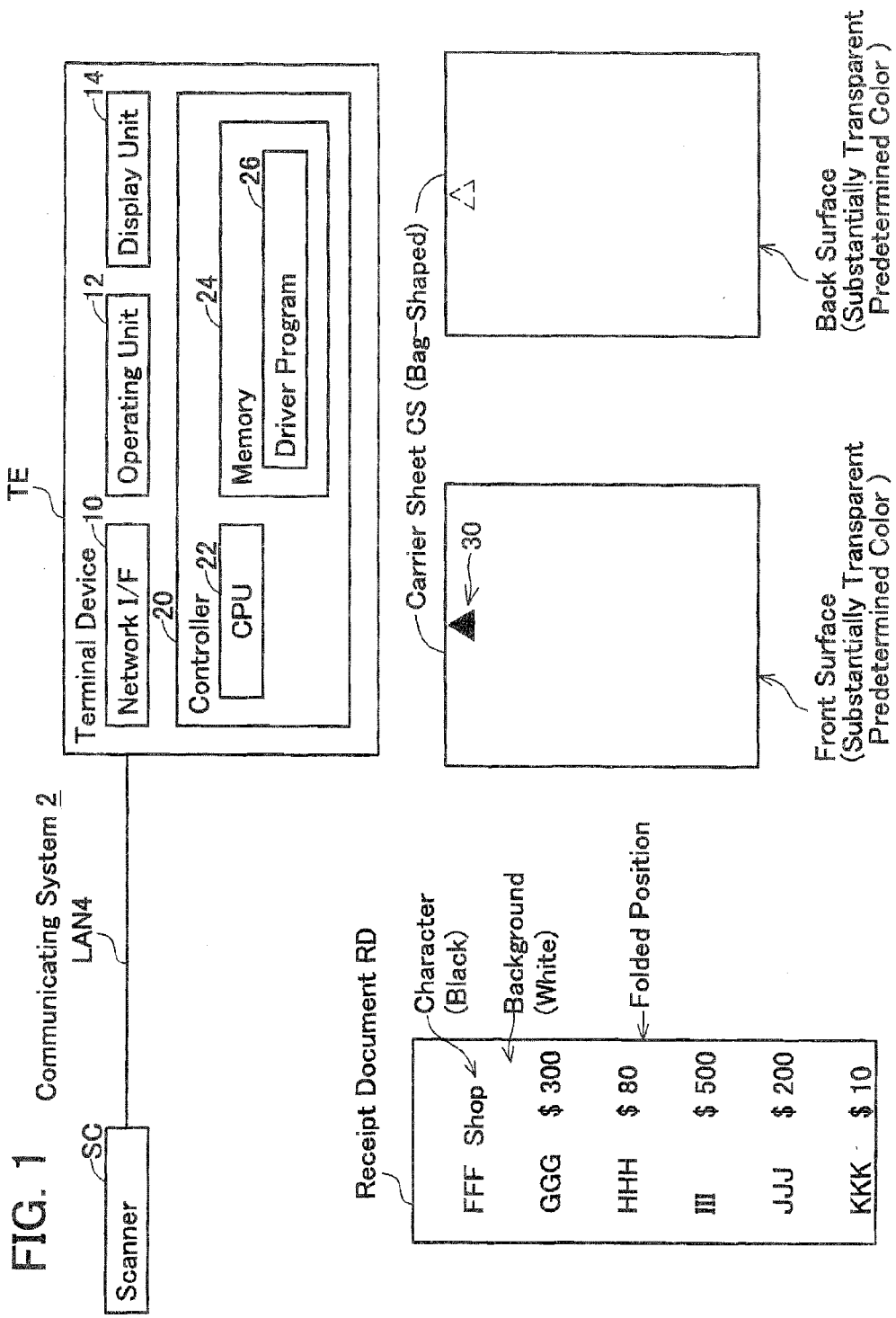
FIG. 1 shows the configuration of a communicating system.

As shown in FIG. 1, a communicating system 2 comprises a scanner SC and a terminal device TE. The scanner SC and the terminal device TE are capable of communicating with one another via a LAN (abbreviation of Local Area Network) 4.

(Configuration of Terminal Device TE)

The terminal device TE is, e.g., a known PC (abbreviation of Personal Computer), and comprises a network interface 10, an operating unit 12, a display unit 14, and a controller 20. The network interface 10 is connected to the LAN 4. The operating unit 12 is a mouse, keyboard, etc. A user can input various instructions to the terminal device TE by operating the operating unit 12. The display unit 14 is a display for displaying various pieces of information.

The controller 20 comprises a CPU 22 and a memory 24. The CPU 22 is a processor which executes various processes (e.g., the processes of FIG. 3, to be described) in accordance with various programs (e.g., an OS (abbreviation of Operating System) program, a driver program 26, to be described, etc.) stored in the memory 24. The driver program 26 stored in the memory 24 is provided by a vendor of the scanner SC, and is a program for executing various processes relating to the scanner SC. The driver program 26 may be, e.g., installed on the terminal device TE from a medium shipped together with the scanner SC, or may be installed on the terminal device TE from a server on the Internet provided by the vendor of the scanner SC.

(Configuration of Scanner SC)

The scanner SC is a peripheral apparatus (i.e., a peripheral apparatus of the terminal device TE) capable of executing a scan function of scanning a scan target object and generating scan image data. For example, the scanner SC can store the scan image data in a memory of the scanner SC. Further, the scanner SC can send the scan image data to the terminal device TE, cause the terminal device TE to store the scan image data, and cause the terminal device TE to execute image processing on the scan image data.

The scanner SC comprises an ADF (Auto Document Feeder) mechanism and a plurality of optical elements (not shown). The ADF mechanism feeds the scan target object toward the optical elements. The optical elements are capable of executing a color scan of the scan target object. The optical elements may be CCD image sensors (Charge Coupled Device Image Sensor), or CIS (Contact Image Sensor). In particular, in the present embodiment, the plurality of optical elements comprise a plurality of front surface optical elements for scanning a front surface of the scan target object fed by the ADF mechanism, and a plurality of back surface optical elements for scanning a back surface of the scan target object. In other words, the front surface optical elements are optical elements which scan the scan target object from a predetermined direction, and the back surface optical elements are optical elements which scan the scan target object from an opposite direction to the predetermined direction. While the scan target object is being fed by the ADF mechanism, the scanner SC can separately scan each of the front surface and the back surface of the scan target object, and simultaneously generate scan image data (i.e., one image file) representing the front surface of the scan target object, and scan image data (i.e., one other image file) representing the back surface of the scan target object.

Further, in the present embodiment, in particular, attention is paid to a situation in which the scanner SC scans a receipt document RD, which is a receipt obtained from shopping or the like, to generate scan image data. Since the receipt document RD is a comparatively thin paper, the receipt document RD may be jammed in the ADF mechanism if fed, as is, by the ADF mechanism. To avoid this, a carrier sheet CS having a bag shape is used. Each of a front surface and a back surface of the carrier sheet CS has a rectangular shape, and has a substantially transparent predetermined color. The front surface of the carrier sheet CS includes a black mark 30 indicating that it is the front surface, and the back surface does not include the mark 30. However, as indicated by the broken line at the back surface of the carrier sheet CS, the mark 30 of the front surface shows through to the back surface. In the scanner SC, the carrier sheet CS is fed by the ADF mechanism with the receipt document RD in a state of being housed in the carrier sheet CS. Thereby, the scanner SC can appropriately execute a scan of the receipt document RD.

The receipt document RD has a rectangular shape. A front surface of the receipt document RD has a white background, and includes a character string object including a plurality of lines of character string having a black color. A plurality of characters (e.g., "FFF Shop") configuring one character string line included in the character string object is aligned along a horizontal direction of FIG. 1. Further, the plurality lines of character string included in the character string object is aligned along a vertical direction of FIG. 1. Moreover, in any image below (e.g., a front surface scan image FSI of FIG. 2, to be described, or the like) and in the image data the direction in which the plurality of characters configuring one character string line is aligned, and a direction orthogonal to that direction, are called "horizontal direction (i.e., left-right direction)" and "vertical direction (i.e., up-down direction)", respectively. Further, although not shown in FIG. 1, a back surface of the receipt document RD has a white background (i.e., is so-called white paper).

The length in the vertical direction of the receipt document RD is a length that cannot be housed in the carrier sheet CS. Consequently, in a situation in which a scan of the receipt document RD must be executed, the receipt document RD is housed in the carrier sheet CS with the receipt document RD in a folded state. Specifically, the scan of the receipt document RD is executed in the following manner.

In case of wanting to store image data representing an image indicating the receipt document RD in the terminal device TE, the user first folds the receipt document RD at the folded position shown in FIG. 1 such that the front surface of the receipt document RD remains facing outward. Next, the user houses the receipt document RD in the carrier sheet CS such that a first half portion of the receipt document RD (i.e., "FFF Shop" to "HHH $80") is facing the front surface of the carrier sheet CS, i.e., a second half portion of the receipt document RD (i.e., "III $500" to "KKK $10") is facing the back surface of the carrier sheet CS. Then, the user sets the carrier sheet CS on the ADF mechanism of the scanner SC so that the front surface of the carrier sheet CS faces a predetermined orientation (e.g., upward). Next, the user starts the driver program 26 of the terminal device TE, and inputs an instruction for scanning the receipt document RD into the terminal device TE. Thereby, a scan instruction is supplied from the terminal device TE to the scanner SC. When obtaining the scan instruction from the terminal device TE, the scanner SC feeds the carrier sheet CS set on the ADF mechanism, and executes a color scan of each of the front surface and the back surface of the carrier sheet CS, generating front surface scan image data representing a front surface scan image, and back surface scan image data representing a back surface scan image. Then, the scanner SC supplies this scan image data to the terminal device TE.

Figure 2:
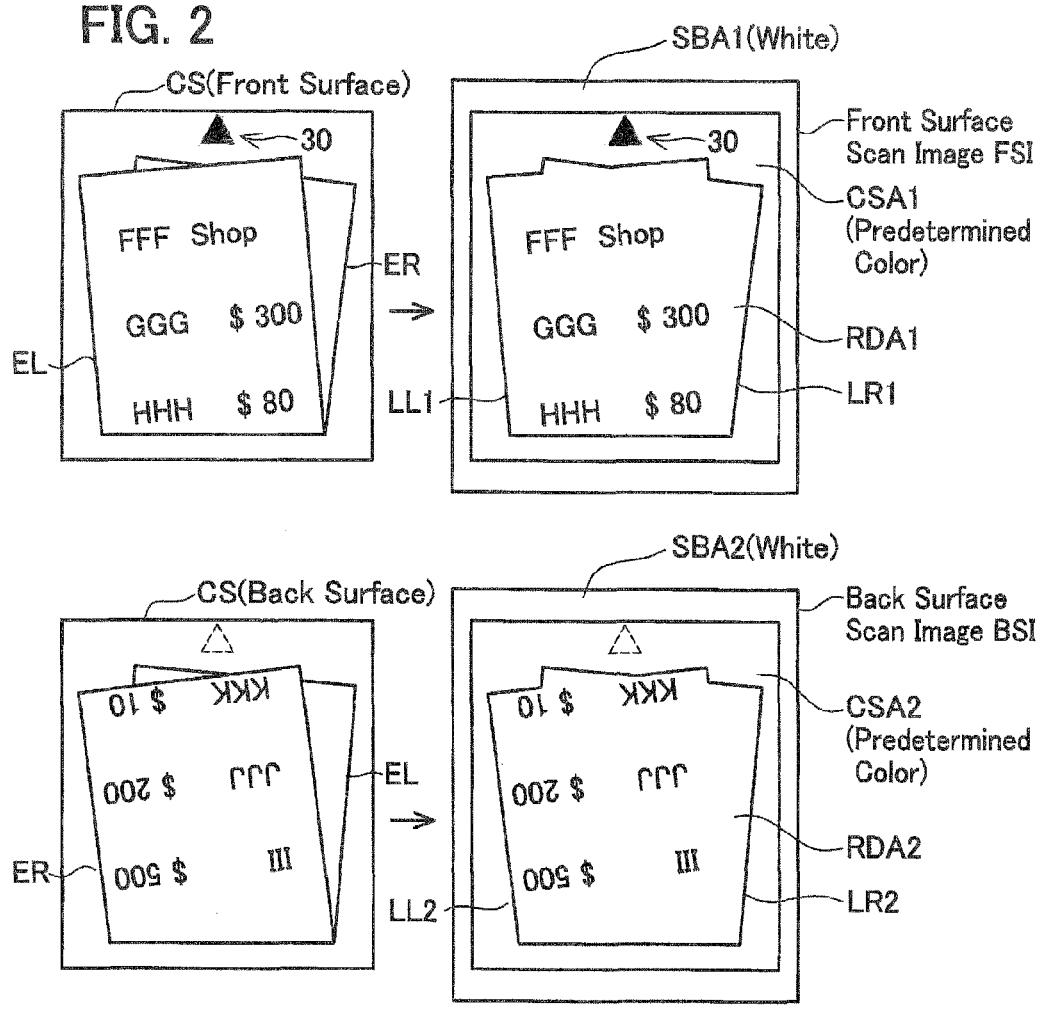
FIG. 2 shows an example of a front surface scan image and a back surface scan image.

(Examples of Scan Image; FIG. 2)

Next, the contents of the scan images will be described with reference to FIG. 2. For example, when the length in the vertical direction of the receipt document RD is large, it may not be possible to fold the receipt document RD successfully. That is, as shown in FIG. 2, the receipt document RD may be folded such that an upper left vertex and a lower left vertex of the receipt document RD do not match (in other words, such that an upper right vertex and a lower right vertex of the receipt document RD do not match). In the present embodiment, a situation is assumed in which a carrier sheet CS housing a receipt document RD in this state is to be scanned. The first half portion of the front surface of the receipt document RD (i.e., "FFF Shop" to "HHH $80") shows through at the front surface of the carrier sheet CS, and the second half portion of the front surface of the receipt document RD (i.e., "III $500" to "KKK $10") shows through at the back surface of the carrier sheet CS.

Front surface scan image data representing the front surface scan image FSI is generated as a result of the front surface of the carrier sheet CS housing the receipt document RD being color scanned, and back surface scan image data representing a back surface scan image BSI is generated as a result of the back surface of the carrier sheet CS being color scanned. The front surface scan image data and the back surface scan image data are each bitmap data configured by a plurality of pixel data. In particular, each piece of pixel data indicates a pixel value expressed as a coordinate value within a RGB color space RGB coordinate system). The R value, G value, and B value are each number values in the range of "0 to 255". The number of pixel data configuring the front surface scan image data, and the number of pixel data configuring the back surface scan image data are the same.

Since a range exceeding the front surface of the carrier sheet CS is scanned, and that range is represented by pixels indicating white, the front surface scan image FSI includes a white scan background area SBA1 indicating that range. Further, the front surface scan image FSI includes a carrier sheet area CSA1 indicating the front surface of the carrier sheet CS, and a receipt document area RDA1 indicating the receipt document RD. In the carrier sheet area CSA1, the major portion is the predetermined color (i.e., the color of the carrier sheet CS), but a portion corresponding to the mark 30 is black. The receipt document area RDA1 includes a character string object image indicating a partial character string object (i.e., "FFF Shop" to "HHH $80") which is the first half portion of the character string object included in the receipt document RD. A straight line LL1 configuring a left edge and a straight line LR1 configuring a right edge of the receipt document area RDA1 correspond to an edge EL and an edge ER of the receipt document RD, respectively. In the present embodiment, the straight line LL1 is longer than the straight line LR1. The two straight lines LL1, LR1 do not have an orthogonal relationship nor parallel relationship, but face each other. In other words, the two straight lines LL1, LR1 do not intersect each other while not being orthogonal nor parallel to each other. Further, an absolute value of the inclination of the straight line LL1 obtained with the vertical direction as the reference differs from an absolute value of the inclination of the straight line LR1 obtained with the vertical direction as the reference.

As with the front surface scan image FSI, the back surface scan image BSI includes a white scan background area SBA2, a carrier sheet area CSA2 of the predetermined color indicating the back surface of the carrier sheet CS, and a receipt document area RDA2 indicating the receipt document RD. The receipt document area RDA2 includes a character string object image indicating a partial character string object (i.e., "III $500" to "KKK $10") which is the second half portion of the character string object included in the receipt document RD. A straight line LL2 configuring a left edge and a straight line LR2 configuring a right edge of the receipt document area RDA2 correspond to the edge ER and the edge EL of the receipt document RD, respectively. Consequently, the straight line LR2 in the back surface scan image BSI has the same length as the straight line LL1 in the front surface scan image FSI, and an absolute value of the inclination of the straight line LR2 obtained with the vertical direction as the reference is equal to the absolute value of the inclination of the straight line LL1 obtained with the vertical direction as the reference. Further, the straight line LL2 in the back surface scan image BSI has the same length as the straight line LR1 in the front surface scan image FSI, and an absolute value of the inclination of the straight line LL2 obtained with the vertical direction as the reference is equal to the absolute value of the inclination of the straight line LR1 obtained with the vertical direction as the reference.

Figure 3:
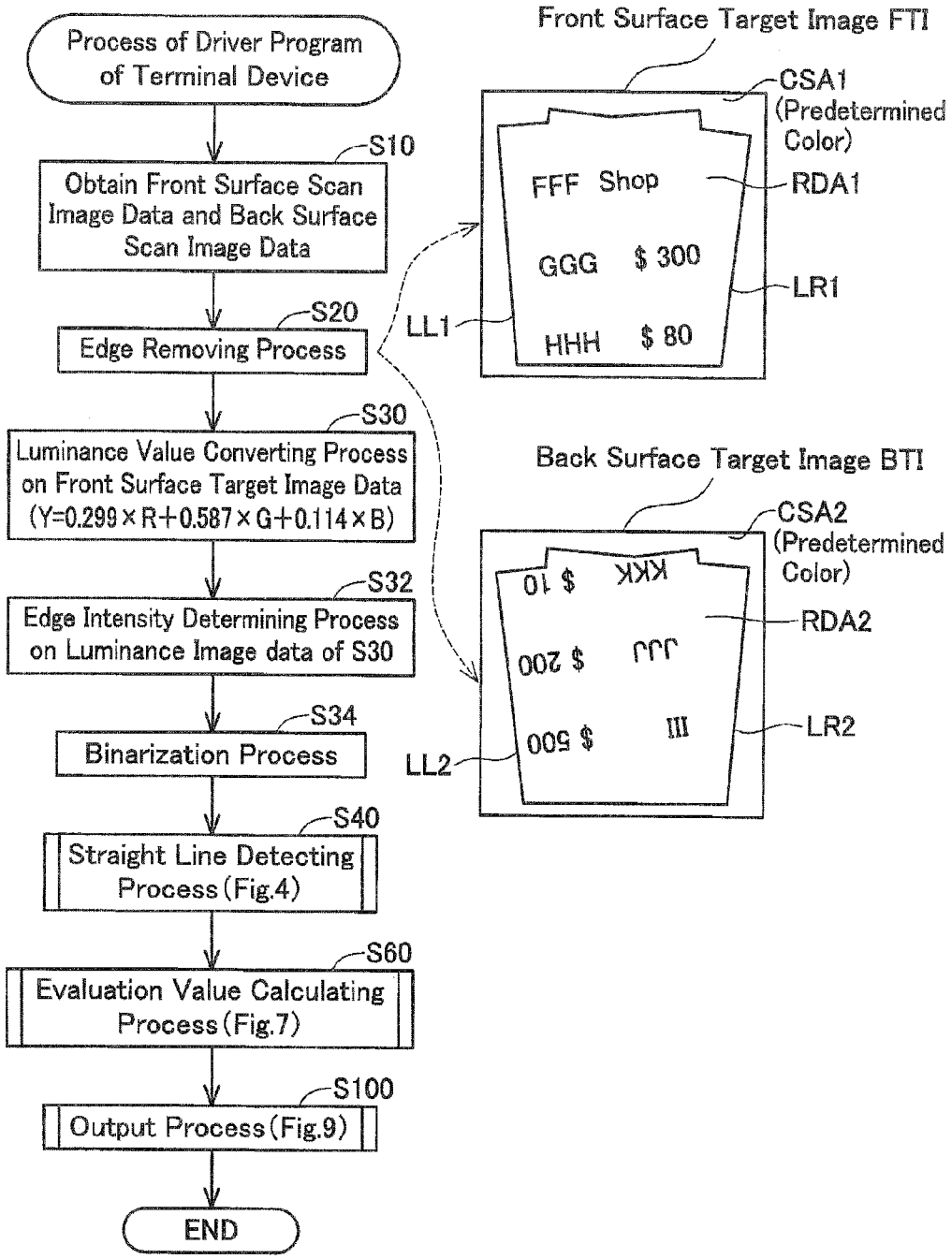
FIG. 3 shows a flowchart of processes of a driver program of a terminal device.

(Driver Program Process of Terminal Device TE; FIG. 3)

Next, the contents of processes executed by the driver program 26 of the terminal device TE will be described with reference to FIG. 3. As described above, in case an instruction for scanning the receipt document RD is input by the user, the CPU 22 of the terminal device TE supplies the scan instruction to the scanner SC. Thereby, in S10, the CPU 22 obtains the front surface scan image data and the back surface scan image data from the scanner SC.

In S20, the CPU 22 executes an edge removing process on each of the front surface scan image data and the back surface scan image data obtained in S10. Specifically, the CPU 22 removes a predetermined number of pixel data present at each upper, lower, left, and right edge among the plurality of pixel data configuring the front surface scan image data representing the front surface scan image FSI of FIG. 2, generating front surface target image data representing a front surface target image FTI. Due to each upper, lower, left, and right edge being removed, the front surface target image FTI does not include the scan background area SBA1 (see FIG. 2), and does not include a part of the carrier sheet area CSA1 (e.g., a part indicating the mark 30). Similarly, the CPU 22 executes the edge removing process on the back surface scan image data representing the back surface scan image BSI of FIG. 2, generating back surface target image data representing a back surface target image BTI. The number of pixel data configuring the front surface target image data and the number of pixel data configuring the back surface target image data are equal.

In S30, the CPU 22 executes a luminance value converting process on the front surface target image data generated in S20. Specifically, for each of a plurality of pixel data configuring the front surface target image data, the CPU 22 converts a pixel value (i.e., the R value, the G value, and the B value) indicated by the pixel data into a luminance value (i.e., Y value) according to a formula in S30, generating new pixel data indicating luminance value. Thereby, luminance image data configured by the plurality of new pixel data indicating luminance value is generated. The luminance value is a numeric value in the range of "0 to 255".

In S32, the CPU 22 executes an edge intensity determining process on the luminance image data generated in S30. Specifically, for each of the plurality of pixel data configuring the luminance image data, the CPU 22 converts the luminance value indicated by the pixel data into an edge intensity value by using a Sobel filter, generating new pixel data indicating the edge intensity value. Thereby, edge intensity image data configured by a plurality of new pixel data indicating the edge intensity value is generated. Moreover, in a variation, the CPU 22 may calculate the edge intensity value by using, instead of a Sobel filter, a first-order differential filter, a second-order differential filter, a Laplacian filter, etc.

In S34, the CPU 22 executes a binarization process on the edge intensity image data generated in S32. Specifically, for each of the plurality of pixel data configuring the edge intensity image data, the CPU 22 converts the edge intensity value indicated by the pixel data into "1" or "0", generating new pixel data indicating "1" or "0". More specifically, the CPU 22 generates new pixel data indicating "1" in the case where the edge intensity value is larger than a predetermined threshold value (the threshold value is a value larger than zero), and generates new pixel data indicating "0" in the case where the edge intensity value is equal to or less than the threshold value. Thereby, binary image data configured by a plurality of new pixel data indicating "1" or "0" is generated. Below, the pixel data indicating "1" and the pixel data indicating "0" are called "ON pixel data" and "OFF pixel data", respectively.

In S40, the CPU 22 executes a straight line detecting process (see FIG. 4, to be described) by using the binary image data generated in S34. That is, the CPU 22 detects, in the front surface target image FTI, the straight line LL1 corresponding to the left edge of the receipt document area RDA1 (i.e., the straight line LL1 which defines the left edge), and the straight line LR1 corresponding to the right edge of the receipt document area RDA1 (i.e., the straight line LR1 which defines the right edge). The two straight lines LL1, LR1 are the longest straight line LL1 included in the front surface target image FTI, and the second longest straight line LR1 included in the front surface target image FTI. The two straight lines LL1, LR1 do not have an orthogonal relationship nor a parallel relationship, but face each other. In other words, the two straight lines LL1, LR1 do not intersect each other while not being orthogonal nor parallel to each other.

In S60, the CPU 22 executes an evaluation value calculating process (to be described, see FIG. 7) by using the two straight lines LL1, LR1 detected in S40. That is, the CPU 22 calculates two evaluation values corresponding to the two straight lines LL1, LR1 detected in S40. Then, by using the two evaluation values, the CPU 22 selects, from among the two straight lines LL1, LR1, one straight line (e.g., LL1) to be a reference for rotating the front surface target image FTI. By using the two evaluation values, the CPU 22 further selects, from among the two straight lines LL1, LR1, the other straight line (e.g., LR1) to be a reference for rotating the back surface target image BTI.

In S100, the CPU 22 executes an output process (to be described, see FIG. 9) by using the front surface target image data and the back surface target image data. That is, the CPU 22 generates combined image data by using the front surface target image data and the back surface target image data, and supplies the combined image data to the display unit 14 (see FIG. 1). Thereby, the user can see a combined image represented by the combined image data, i.e., an output image showing the receipt document RD which was scanned in the folded state. When S100 ends, the process of FIG. 3 ends.

Figure 4:
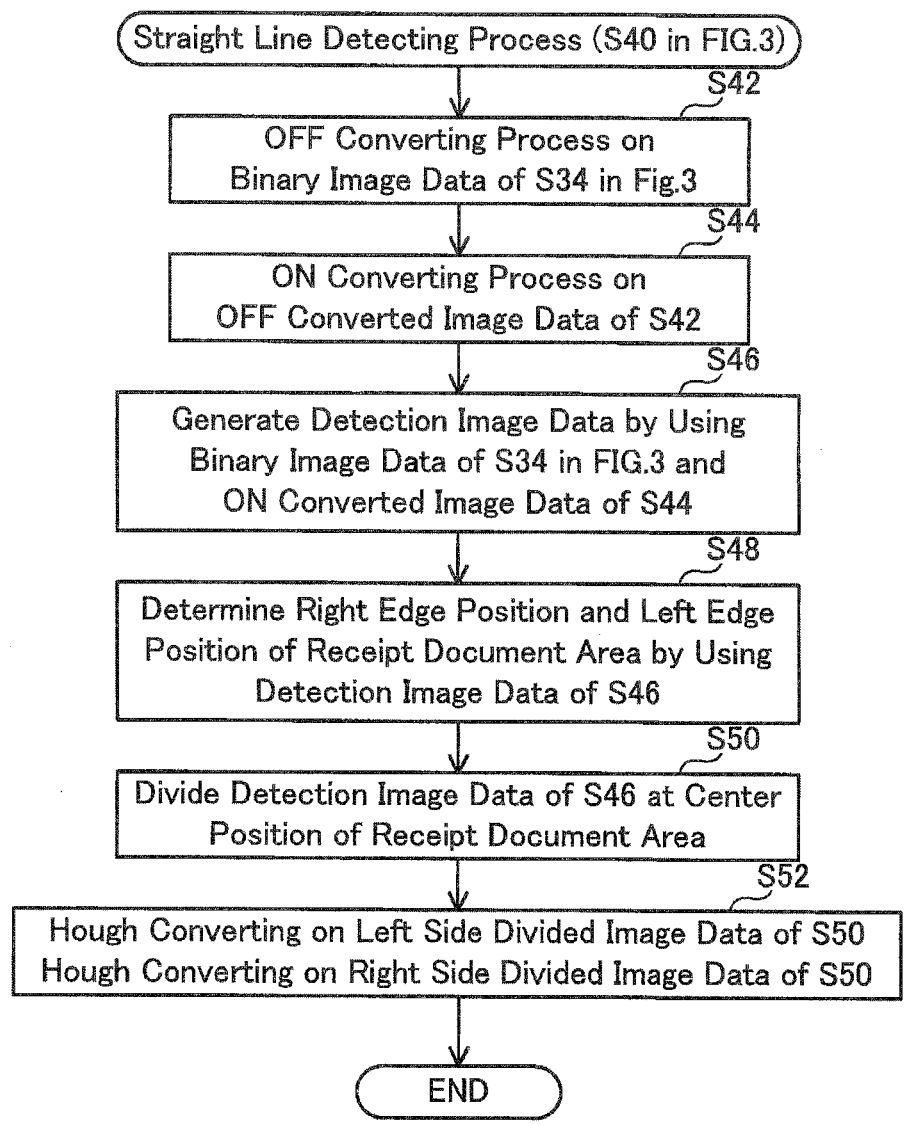
FIG. 4 shows a flowchart of a straight line detecting process.

(Straight Line Detecting Process; FIG. 4)

Next, the contents of the straight line detecting process of S40 of FIG. 3 will be described with reference to FIG. 4. In S42, the CPU 22 executes an OFF converting process on the binary image data generated in S34 of FIG. 3. Specifically, for each of the plurality of OFF pixel data configuring the binary image data, the CPU 22 changes all of ON pixel data included in nine pieces of pixel data centered in the OFF pixel data (i.e., 3 pieces of pixel data in the horizontal direction×3 pieces of pixel data in the vertical direction) into OFF pixel data. Thereby, OFF converted image data configured by a plurality of pixel data indicating "1" or "0" is generated.

In S44, an ON converting process is executed on the OFF converted image data generated in S42. Specifically, for each of the plurality of ON pixel data configuring the OFF converted image data, the CPU 22 changes all of OFF pixel data included in 25 pieces of pixel data centered in the ON pixel data (i.e., 5 pieces of pixel data in the horizontal direction×5 pieces of pixel data in the vertical direction) into ON pixel data. Thereby, ON converted image data configured by a plurality of pixel data indicating "1" or "0" is generated.

Moreover, the number of pixel data that is the target of the processes of S42 and S44 is not limited to "9" and "25" respectively, but may be another number. Generally speaking, in S42, the CPU 22 may change all of ON pixel data included in M×M pieces of pixel data (the M being an integer of 2 or more) in which the OFF pixel data is the center into OFF pixel data. Further, in S44, the CPU 22 may change all of OFF pixel data included in N×N pieces of pixel data (the N being an integer of 2 or more) in which the ON pixel data is the center into ON pixel data. Further, although the N is preferably a larger value than the M, the N may be a value equal to or lower than the M.

In S46, the CPU 22 generates detection image data by using the binary image data generated in S34 of FIG. 3, and the ON converted image data generated in S44. Specifically, the CPU 22 first specifies, from among the plurality of pixel data configuring the binary image data, each pixel data present at positions corresponding to the ON pixel data configuring the ON converted image data. Then, the CPU 22 changes all the ON pixel data in the specified pixel data into OFF pixel data. Thereby, the detection image data configured by a plurality of pixel data indicating "1" or "0" is generated.

In S48, the CPU 22 determines left edge position and right edge position of the receipt document area indicating the receipt document RD within a detection image represented by the detection image data generated in S46.

In S50, the CPU 22 first removes, among the detection image data generated in S46, partial image data present at the left side of the left edge position determined in S48 and partial image data present at the right side of the right edge position determined in S48. Then, the CPU 22 divides the detection image data at a center position in the horizontal direction of the detection image data after the partial image data has been removed, i.e., at a center position of the right edge position and the left edge position determined in S48, generating left side divided image data and the right side divided image data.

In S52, the CPU 22 executes a Hough converting process on the left side divided image data generated in S50, and detects the longest straight line in a left side divided image represented by the left side divided image data. The Hough converting process is a process in which a large number of virtual lines are placed in an image, the number of consecutive ON pixels (i.e., pixels represented by the ON pixel data) on the virtual lines is specified, and a virtual line having the largest number of ON pixels is detected as the longest straight line. Further, the CPU 22 executes the Hough converting process on the right side divided image data generated in S50, detecting the longest straight line in a right side divided image represented by the right side divided image data. Thereby, the CPU 22 can detect the longest straight line and the second longest straight line in the detection image represented by the detection image data generated in S46. In other words, the CPU 22 can detect the longest straight line LL1 and the second longest straight line LR1 in the front surface scan image FSI of FIG. 2. When S52 ends, the process of FIG. 4 ends.

Figure 5:
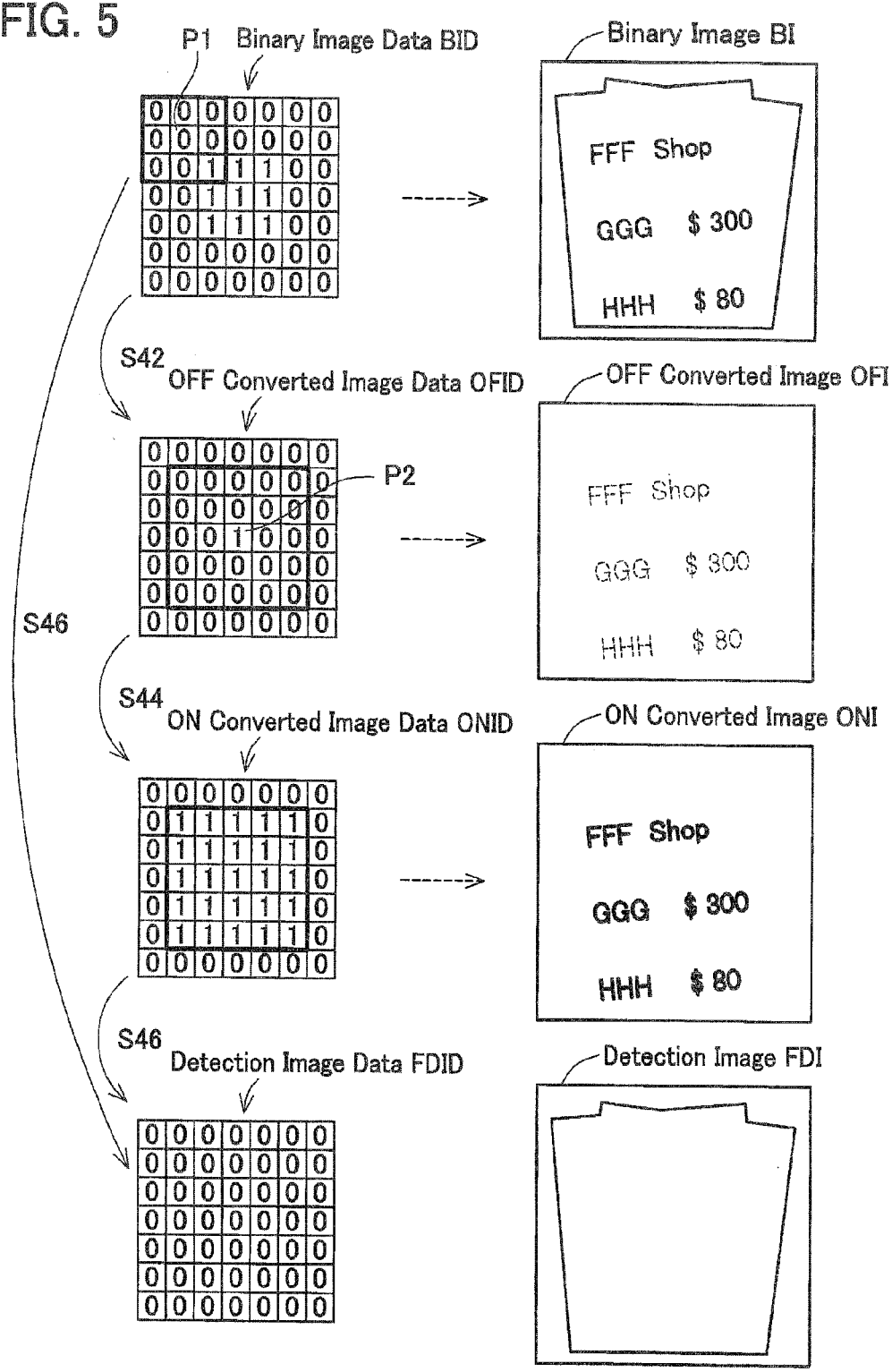
FIG. 5 shows examples of a binary image, OFF converted image, ON converted image, and detection image generated in the straight line detecting process.

(Specific Contents of Straight Line Detecting Process; FIG. 5)

Next, the specific contents of the straight line detecting process of FIG. 4 will be described with reference to FIG. 5. FIG. 5 shows the binary image data BID generated in S34 of FIG. 3, the OFF converted image data OFID generated in S42 of FIG. 4, the ON converted image data ONID generated in S44, and the detection image data FDID generated in S46. In this image data, not all of the pixel data is shown. Only a part of the pixel data (i.e., 7 pieces of pixel data in the horizontal direction×7 pieces of pixel data in the vertical direction 49 pieces of pixel data) is shown.

In a binary image BI represented by the binary image data BID, ON pixels represented by the ON pixel data, and OFF pixels represented by the OFF pixel data are represented by black and white, respectively. For example, the pixels configuring the edges of the receipt document RD, and the pixels configuring the character string object have a comparatively high edge intensity. Consequently, in the binary image BI, these pixels are represented by black (i.e., the ON pixels). The point of the ON pixels and the OFF pixels being represented by black and white, respectively, is also the same in the images OFI, ONI, FDI, etc. below.

In S42 of FIG. 4, the CPU 22 executes the OFF converting process on the binary image data BID, generating the OFF converted image data OFID. For example, all the ON pixel data included in nine pieces of pixel data (i.e., the pixel data surrounded by the bold line), in which the one piece of OFF pixel data P1 configuring the binary image data BID is the center, is changed into OFF pixel data. When the OFF converting process is executed, the ON pixels configuring the edges of the receipt document RD, and a part of the ON pixels configuring the character string object can become OFF pixels. Consequently, in the OFF converted image OFI, the edges of the receipt document RD are represented by white (i.e., have vanished), and each character in the character string object is represented by a thin black line.

Next, in S44, the CPU 22 executes the ON converting process on the OFF converted image data OFID, generating the ON converted image data ONID. For example, all the OFF pixel data included in 25 pieces of pixel data (i.e., the pixel data surrounded by the bold line), in which the one piece of ON pixel data P2 configuring the OFF converted image data OFID is the center, is changed into ON pixel data. The number of pixels (i.e., 25) that is the target of the ON converting process of S44 is greater than the number of pixels (i.e., 9) that is the target of the OFF converting process of S42. Consequently, lines configuring the characters included in the ON converted image ONI can be greater than lines configuring the characters included in the binary image BI. Consequently, in the ON converted image ONI, the characters configuring the character string object are represented by bold black lines.

Next, in S46, the CPU 22 specifies, from among the plurality of pixel data configuring the binary image data BID, the pixel data present at the positions corresponding to the ON pixel data configuring the ON converted image data ONID. Then, the CPU 22 changes all the ON pixel data in the specified pixel data into OFF pixel data, generating the detection image data I-DID. Thereby, in the detection image FDI, a high-density area in which the density of the ON pixels in the binary image BI is comparatively high is represented by the OFF pixels, and a low-density area in which the density of the ON pixels in the binary image BI is comparatively low is represented by the ON pixels. That is, in the detection image FDI, the high-density area configuring the character string object is represented by the OFF pixels, and the low-density area configuring the edges of the receipt document RD in the binary image BI is represented by the ON pixels.

When there is a large number of ON pixels in an image that is the target of the Hough converting process, the processing load of the Hough converting process is usually high. In the detection image FDI, the character string object included in the receipt document RD is represented as OFF pixels, thus reducing the number of ON pixels in the image that is the target of the Hough converting process of S52 of FIG. 4. Consequently, the CPU 22 can execute the Hough converting process rapidly.

(Continuation of Specific Contents of Straight Line Detecting Process; FIG. 6)

Next, a continuation of FIG. 5 will be described with reference to FIG. 6. In S48 of FIG. 4, the CPU 22 generates a projection histogram H48 by using the detection image data FDID generated in S46. The projection histogram H48 represents distribution of an appearance frequency of the ON pixel data in a case where a plurality of pixel data configuring the detection image data is projected along the vertical direction.

Next, the CPU 22 specifies a position WL showing an initial occurrence of an appearance frequency equal to or greater than a predetermined threshold value Th1 (Th1 being a value greater than zero) while proceeding from a left edge toward a right side of the projection histogram H48, and specifies a position WR showing an initial occurrence of a frequency equal to or greater than the threshold value Th1 while proceeding from a right edge toward a left side of the projection histogram H48. Thereby, the CPU 22 can specify, in the detection image FDI, the position WL near a left edge of the receipt document area indicating the receipt document RD, and the position WR near a right edge of the receipt document area. In particular, since the positions WL, WR are determined based on the threshold value Th1 that is larger than zero, a position having a frequency that is higher than zero and lower than the threshold value Th1 is not specified as a position near the left edge or right edge of the receipt document area. Thereby, if for example noise such as dirt or dust is present on the carrier sheet CS, the position of the noise is not specified as a position near the left edge or right edge of the receipt document area. Consequently, a position near the left edge and a position near the right edge of the receipt document area are specified appropriately. However, since the positions WL, WR are determined based on the threshold value Th1 that is larger than zero, the position WL is a position at a right side of the left edge of the receipt document area, and the position WR is a position at a left side of the right edge of the receipt document area. That is, the positions WL, WR are positions inside the receipt document area. Consequently, the CPU 22 determines a position at a left side that is a predetermined length (e.g., 20 pixels) from the position WL as a left edge position of the receipt document area, and determines a position at a right side that is the predetermined length from the position WR as a right edge position of the receipt document area.

Next, in S50, the CPU 22 generates the left side divided image data representing the left side divided image LDI, and the right side divided image data representing the right side divided image RDI. A partial image present at the left side of the left edge position of the receipt document area in the detection image FDI is removed, and the left side divided image LDI is obtained. Further, a partial image present at the right side of the right edge position of the receipt document area in the detection image FDI is removed, and the right side divided image RDI is obtained. Thus, in the present embodiment, the CPU 22 decreases the size of the image that is the target of the Hough converting process, and consequently can rapidly execute the Hough converting process.

Next, in S52, the CPU 22 executes the Hough converting process on the left side divided image LDI and detects the longest straight line LL1 in the left side divided image LDI, and executes the Hough converting process on the right side divided image RDI and detects the longest straight line LR1 in the right side divided image RDI. An angle between the straight line LL1 and the vertical direction (i.e., the up-down direction of FIG. 6) is α, and an angle between the straight line LR1 and the vertical direction is β. If a configuration is adopted in which the Hough converting process is executed on the detection image FDI without the detection image FDI being divided, the following circumstances may occur. For example, the straight line EL (see FIG. 2) of the left edge of the receipt document RD may be scanned as double lines rather than being scanned properly as one straight line. In this case, since the longest straight line and the second longest straight line may be present in an area at the left side in the detection image FDI, these two straight lines may be detected. That is, it may happen that the straight line corresponding to the straight line ER (see FIG. 2) of the right edge of the receipt document RD is not detected. In this case, the appropriate combined image is not output in S100 of FIG. 3. In contrast, in the present embodiment, the detection image FDI is divided into the left side divided image LDI and the right side divided image RDI, and the longest straight lines LL1, LR1 from the respective images LDI, RDI are detected. Consequently, the straight line LL1 corresponding to the left edge of the receipt document RD, and the straight line LR1 corresponding to the right edge of the receipt document RD, are appropriately detected.

Figure 7:
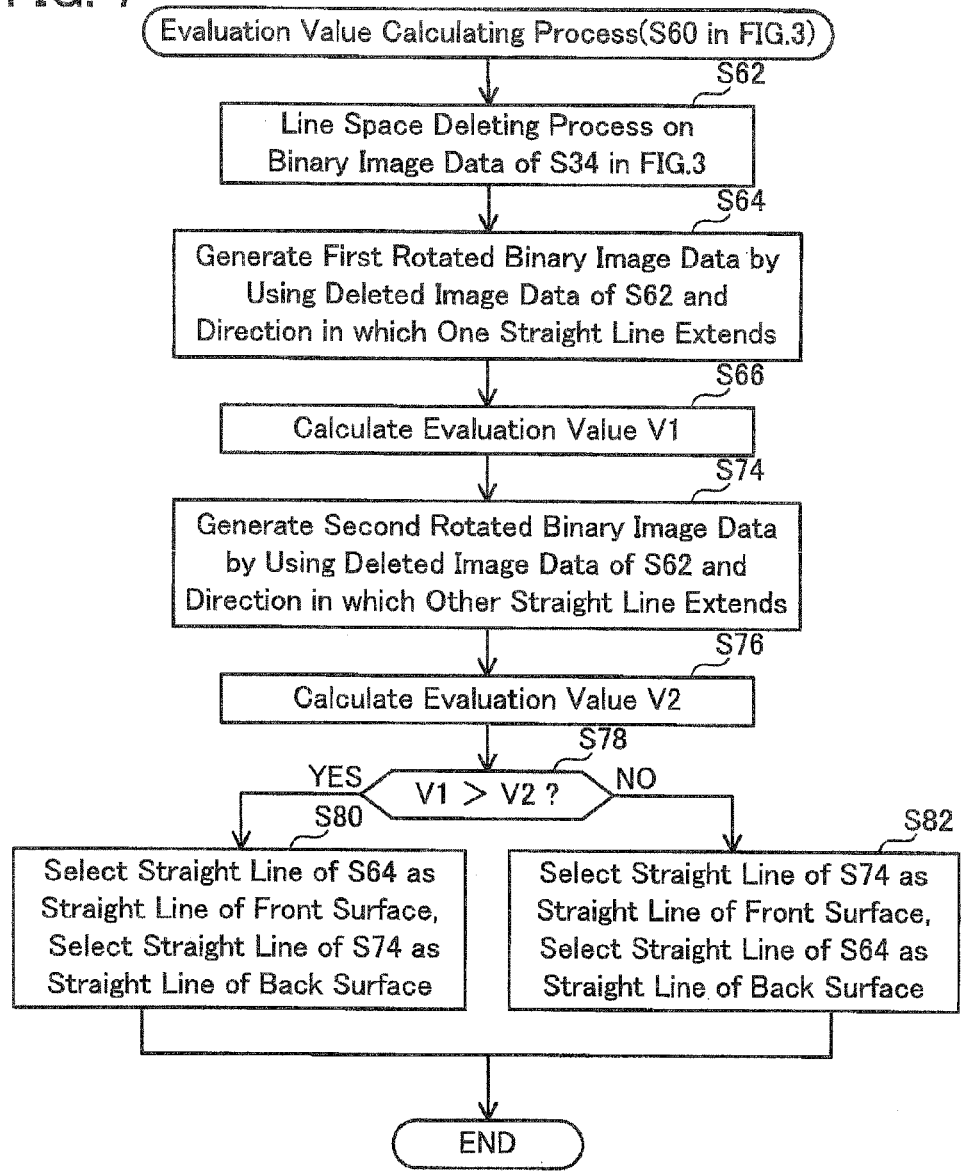
FIG. 7 shows a flowchart of an evaluation value calculating process.

(Evaluation Value Calculating Process; FIG. 7)

Next, the contents of the evaluation value calculating process of S60 of FIG. 3 will be described with reference to FIG. 7. In S62, the CPU 22 executes a line space deleting process on the binary image data generated in S34 of FIG. 3. Specifically, the CPU 22 deletes pixel data representing line spaces of the character strings in the plurality of pixel data configuring the binary image data. Thereby, deleted image data configured by a plurality of pixel data indicating "1" or "0" is generated.

In S64, the CPU 22 generates first rotated binary image data by using the deleted image data generated in S62, and the direction in which one straight line (e.g., LL1 of FIG. 6), of the two straight lines detected in S52 of FIG. 4, extends. Specifically, the CPU 22 generates the first rotated binary image data representing a first rotated binary image obtained by rotating a deleted image represented by the deleted image data such that the direction in which the one straight line extends matches the vertical direction. Thereby, the first rotated binary image data configured by the plurality of pixel data indicating "1" or "0" is generated.

In S66, the CPU 22 calculates an evaluation value V1 by using the first rotated binary image data generated in S64. The evaluation value V1 is a value related to the direction of the character string object image in the first rotated binary image. Specifically, the evaluation value V1 has a comparatively large value in a case where the plurality of characters configuring one character string line extends along the horizontal direction, and indicates a comparatively small value in a case where the plurality of characters does not extend along the horizontal direction (i.e., the plurality of characters extends along the diagonal direction).

In S74, the CPU 22 generates second rotated binary image data by using the deleted image data generated in S62, and the direction in which the other straight line (e.g., LR1 of FIG. 6), of the two straight lines detected in S52 of FIG. 4, extends. Specifically, the CPU 22 generates the second rotated binary image data representing a second rotated binary image obtained by rotating a deleted image represented by the deleted image data such that the direction in which the other straight line extends matches the vertical direction. Thereby, the second rotated binary image data configured by a plurality of pixel data indicating "1" or "0" is generated.

In S76, the CPU 22 calculates an evaluation value V2 by using the second rotated binary image data generated in S74. The evaluation value V2 is a value related to the direction of the character string object image in the second rotated binary image.

In S78, the CPU 22 determines whether the evaluation value V1 calculated in S66 is larger than the evaluation value V2 calculated in S76. In case of determining that the evaluation value V1 is larger than the evaluation value V2 (YES in S78), in S80 the CPU 22 selects the one straight line (e.g., LL1) used in S64 as a straight line corresponding to the front surface target image FTI (see FIG. 3) (called "straight line of front surface" below), and selects the other straight line (e.g., LR1) used in S74 as a straight line corresponding to the back surface target image BTI (called "straight line of back surface" below). Further, in a case where the evaluation value V1 is equal to or less than the evaluation value V2 (NO in S78), in S82 the CPU 22 selects the other straight line used in S74 as the straight line of front surface, and selects the one straight line used in S64 as the straight line of back surface. When S80 or S82 ends, the process of FIG. 7 ends.

Figure 8:
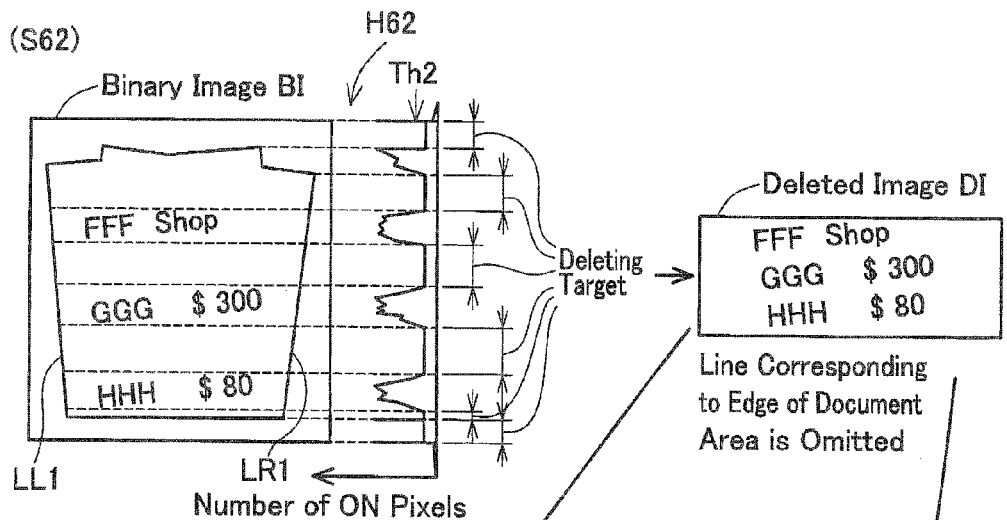
FIG. 8 shows examples of a deleted image and rotated binary images generated in the evaluation value calculating process.

(Specific Contents of Evaluation Value Calculating Process; FIG. 8)

Next, the specific contents of the evaluation value calculating process of FIG. 7 will be described with reference to FIG. 8. In S62 of FIG. 7, the CPU 22 first generates a projection histogram H62 by using the binary image data representing the binary image BI. The projection histogram H62 represents distribution of an appearance frequency of the ON pixel data in a case where a plurality of pixel data configuring the binary image data is projected along the horizontal direction. Next, the CPU 22 determines, as a deleting target, projection lines (i.e., areas in the vertical direction) in which the appearance frequency of the ON pixel data is equal to or less than a predetermined threshold value Th2 (Th2 being a value greater than zero) in the projection histogram H62. These areas are areas corresponding to the line space of the character strings. Then, the CPU 22 removes the pixel data, in the plurality of pixel data configuring the binary image data, that represents the areas of the deleting target. Thereby, deleted image data representing a deleted image DI is generated. Moreover, in FIG. 8, straight lines corresponding to edges of the receipt document area indicating the receipt document RD are not shown in the deleted image DI.

In S64, the CPU 22 generates first rotated binary image data representing a first rotated binary image RBI1 obtained by rotating the deleted image DI such that the detected straight line LL1 and the vertical direction match. That is, the first rotated binary image RBI1 is an image obtained by rotating the deleted image DI clockwise with the angle α between the straight line LL1 and the vertical direction as the rotation angle.

In S66, the CPU 22 generates a projection histogram H66 by using the first rotated binary image data representing the first rotated binary image RBI1. The projection histogram H66 represents distribution of an appearance frequency of the ON pixel data in a case where a plurality of pixel data configuring the first rotated binary image data is projected along the horizontal direction (i.e., a direction orthogonal to the straight line LL1). In the first rotated binary image RBI1, since the character string object image is represented by the ON pixels, the projection histogram H66 can be said to represent distribution of an appearance frequency of pixel data representing the character string object image. Next, the CPU 22 calculates, as the evaluation value V1, a total number of low-frequency projection lines (i.e., the length in the vertical direction) in which the appearance frequency of the ON pixel data in the projection histogram H66 is equal to or less than a predetermined threshold value Th3 (Th3 being a value greater than zero). The low-frequency projection lines correspond to the line spaces of the character strings. In the first rotated binary image RBI1, the plurality of characters configuring one character string line is aligned along the horizontal direction, consequently the number of low-frequency projection lines corresponding to the line spaces increases, and therefore the evaluation value V1 increases.

In S74, the CPU 22 generates the second rotated binary image data representing a second rotated binary image RBI2 obtained by rotating the deleted image DI such that the detected straight line LR1 and the vertical direction match. That is, the second rotated binary image RBI2 is an image obtained by rotating the deleted image DI anti-clockwise with the angle β between the straight line LR1 and the vertical direction as the rotation angle.

In S76, as in S66, the CPU 22 generates a projection histogram H76 by using the second rotated binary image data representing the second rotated binary image RBI2 and calculates, as the evaluation value V2, the total number of low-frequency projection lines in the projection histogram H76. Moreover, the projection histogram H66 represents distribution of an appearance frequency of the ON pixel data in a case where a plurality of pixel data configuring the second rotated binary image data is projected along the horizontal direction (i.e., a direction orthogonal to the straight line LR1). In the second rotated binary image RBI2, the plurality of characters configuring one character string line is aligned along a diagonal direction, and consequently the number of low-frequency projection lines corresponding to the line spaces is smaller, and therefore the evaluation value V2 is smaller (in the example of FIG. 8 the evaluation value V2 is zero).

In the example of FIG. 8, since the evaluation value V1 is determined to be larger than the evaluation value V2 (YES in S78), in S80, the straight line LL1 is selected as the straight line of front surface. In other words, in the front surface scan image FSI of FIG. 2, the straight line LL1 orthogonal to the direction in which the plurality of characters configuring one character string line is aligned is selected as the straight line of front surface. Further, the straight line LR1 is selected as the straight line of back surface. As a result, in later processing, the rotation of the front surface target image FTI is executed based on the angle α between the straight line LL1 and the vertical direction, and the rotation of the back surface target image BTI is executed based on the angle β between the straight line LR1 and the vertical direction (S100 of FIG. 3, S102, S112 of FIG. 9).

As described above, in the present embodiment, the evaluation value is not calculated based on a rotated binary image obtained by rotating the binary image BI itself (called "rotated binary image of the comparative example" below), but instead the evaluation value is based on the rotated binary images RBI1, RBI2 obtained by rotating the deleted image DI. Since the line spaces of the character strings in the binary image BI are large, in the rotated binary image of the comparative example obtained by rotating the binary image BI based on the angle β, also, the number of low-frequency projection lines is comparatively large, and therefore the evaluation value is comparatively large. In contrast, since the line spaces of the character strings in the deleted image DI of the present embodiment are small, in the second rotated binary image RBI2 obtained by rotating the deleted image DI based on the angle β, the number of low-frequency projection lines is extremely small, and therefore the evaluation value V2 is extremely small (in the example of FIG. 8, the evaluation value V2 is zero). Thus, since the value of the evaluation value V2, which is the smaller of the two evaluation values V1, V2 of the comparison target, is extremely small, the accuracy of the comparison of the evaluation values V1, V2 increases. As a result, the CPU 22 can appropriately select the straight line of front surface and straight line of back surface.

Figure 9:
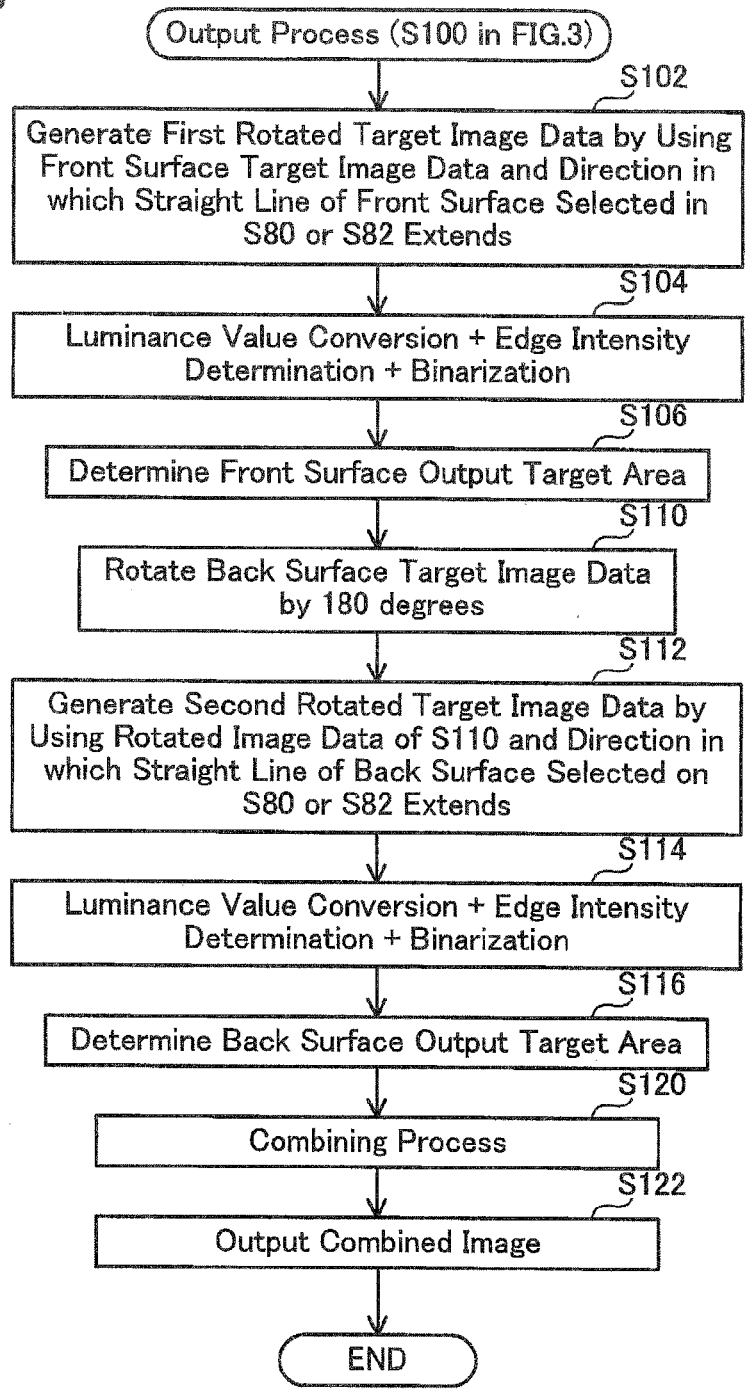
FIG. 9 shows a flowchart of an output process.

(Output Process; FIG. 9)

Next, the contents of the output process of S100 of FIG. 3 will be described with reference to FIG. 9. In S102, the CPU 22 generates first rotated target image data by using the front surface target image data generated in S20 of FIG. 3, and the direction in which the straight line of front surface selected in S80 or S82 of FIG. 7 extends. Specifically, the CPU 22 generates the first rotated target image data representing a first rotated target image obtained by rotating the front surface target image FTI represented by the front surface target image data such that the direction in which the straight line of front surface extends and the vertical direction match. Thereby, the first rotated target image data configured by a plurality of pixel data indicating RGB values is generated.

In S104, the CPU 22 sequentially executes the luminance value converting process, the edge intensity determining process, and the binarization process on the first rotated target image data generated in S102. These processes are the same as S30 to S34 of FIG. 3. Thereby, front surface binary image data configured by a plurality of pixel data indicating "1" or "0" is generated.

In S106, by using the front surface binary image data generated in S104, the CPU 22 determines a front surface output target area indicating the receipt document RD in the first rotated target image represented by the first rotated target image data generated in S102. Next, the CPU 22 obtains front surface partial image data representing the front surface output target area in the first rotated target image data generated in S102.

In S110, the CPU 22 rotates the back surface target image data generated in S20 of FIG. 3 by 180 degrees, generating rotated image data.

In S112, the CPU 22 generates second rotated target image data by using the rotated image data generated in S110, and the direction in which the straight line of back surface selected in S80 or S82 of FIG. 7 extends. Specifically, the CPU 22 generates the second rotated target image data representing a second rotated target image obtained by rotating a rotated image represented by the rotated image data such that the direction in which the straight line of back surface extends and the vertical direction match. Thereby, the second rotated target image data configured by a plurality of pixel data indicating RGB values is generated.

In S114, the CPU 22 sequentially executes the luminance value converting process, the edge intensity determining process, and the binarization process on the second rotated target image data generated in S112. These processes are the same as S30 to S34 of FIG. 3. Thereby, back surface binary image data configured by a plurality of pixel data indicating "1" or "0" is generated.

In S116, by using the back surface binary image data generated in S114, the CPU 22 determines a back surface output target area indicating the receipt document RD in the second rotated target image represented by the second rotated target image data generated in S112. Next, the CPU 22 obtains back surface partial image data representing the back surface output target area in the second rotated target image data generated in S112.

In S120, the CPU 22 combines the front surface partial image data obtained in S106, and the back surface partial image data obtained in S116, generating the combined image data representing the combined image.

In S122, the CPU 22 supplies the combined image data to the display unit 14 (see FIG. 1). Thereby, the user can see the combined image represented by the combined image data, i.e., the output image showing the receipt document RD scanned in a folded state. When S122 ends, the process of FIG. 9 ends.

Figure 10:
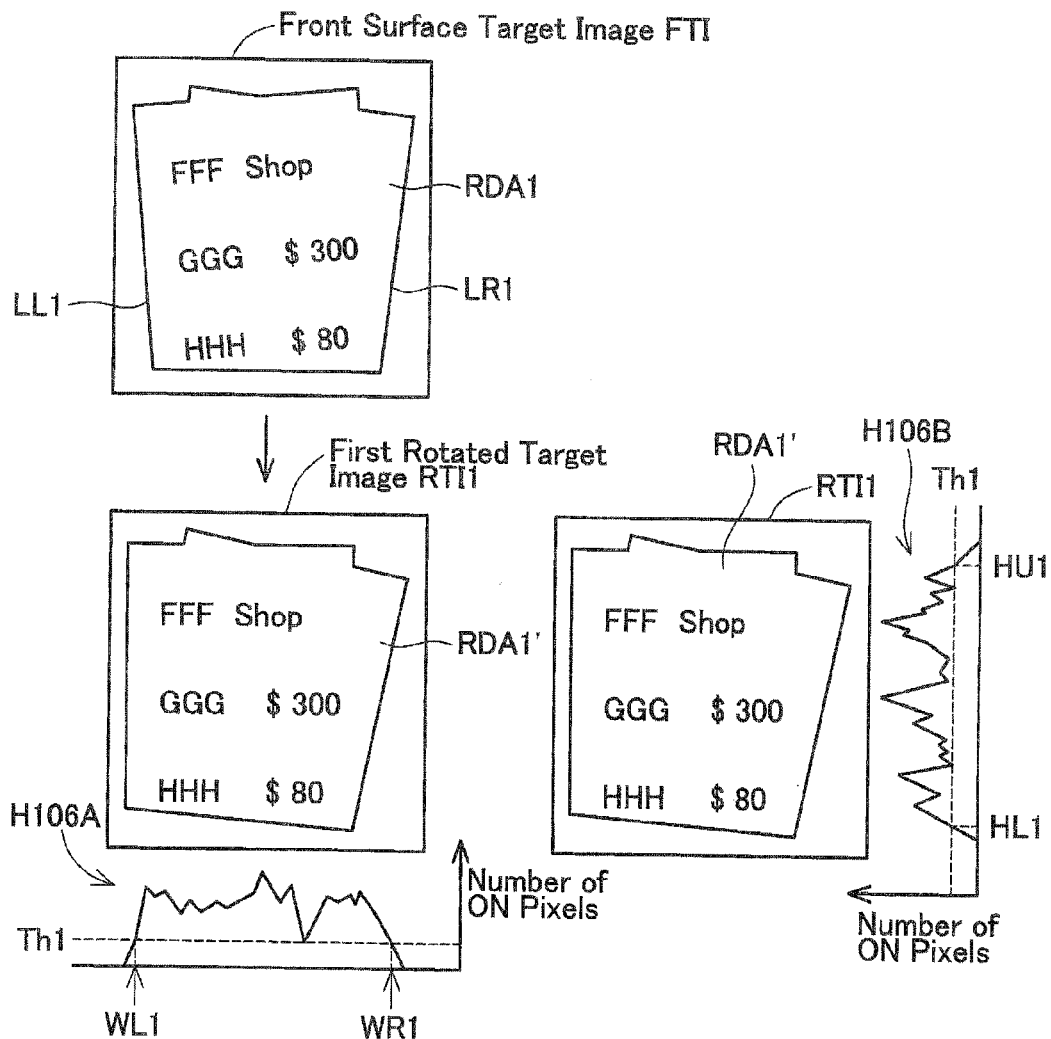
FIG. 10 shows examples of first rotated target images generated in the output process.

(Specific Contents of Output Process; FIG. 10)

Next, a specific example of the output process of FIG. 9 will be described with reference to FIG. 10. In S102 of FIG. 9, the CPU 22 generates the first rotated target image data representing a first rotated target image RTI1 obtained by rotating the front surface target image FTI such that the direction in which the straight line of front surface LL1 extends and the vertical direction match. That is, the first rotated target image data is generated which represents the first rotated target image RTI1 obtained by rotating the front surface target image FTI in a clockwise direction with the angle α of FIG. 6 as the rotation angle.

In S106, the CPU 22 generates a projection histogram H106A by using the front surface binary image data generated in S104. The projection histogram H106A represents distribution of an appearance frequency of the ON pixel data in a case where the plurality of pixel data configuring the front surface binary image data is projected along the vertical direction. Next, by using the same method as the method executed on the projection histogram H48 of FIG. 6, the CPU 22 specifies, in the first rotated target image RTI1, a position WL1 near a left edge of a receipt document area RDA1', and a position WR1 near a right edge of the receipt document area RDA1'. The positions WL1, WR1 are positions inside the receipt document area RDA1'.

Further, the CPU 22 generates a projection histogram H106B by using the front surface binary image data generated in S104. The projection histogram H106B represents distribution of an appearance frequency of the ON pixel data in a case where the plurality of pixel data configuring the front surface binary image data is projected along the horizontal direction. Next, the CPU 22 specifies a position HU1 showing an initial occurrence of an appearance frequency equal to or greater than the threshold value Th1 while proceeding from an upper edge toward a lower side of the projection histogram H106B, and specifies a position HL1 showing an initial occurrence of a frequency equal to or greater than the threshold value Th1 while proceeding from a lower edge toward an upper side of the projection histogram H106B. Thereby, the CPU 22 specifies, in the first rotated target image RTI1, the position HU1 near the upper edge of the receipt document area RDA1', and the position HL1 near the lower edge of the receipt document area RDA1'. The positions HU1, HL1 are positions inside the receipt document area RDA1'.

Next, the CPU 22 determines, as the front surface output target area FOA, an expanded area within the first rotated target image RTI1 in which the orientation of upper, lower, left, and right of a rectangle area defined by the specified four positions WL1, WR1, HU1, HL1 have been expanded by a predetermined size (e.g., 20 pixels). As described above, the positions WL1, WR1, HU1, HL1 are positions inside the receipt document area RDA1'. However, since the expanded area, in which the rectangle area defined by the positions WL1, WR1, HU1, HL1 has been expanded, is determined as the front surface output target area FOA, the front surface output target area FOA is determined that includes the entire receipt document area RDA1'. Then, the CPU 22 obtains the front surface partial image data representing the front surface output target area FOA within the first rotated target image data.

Figure 11:
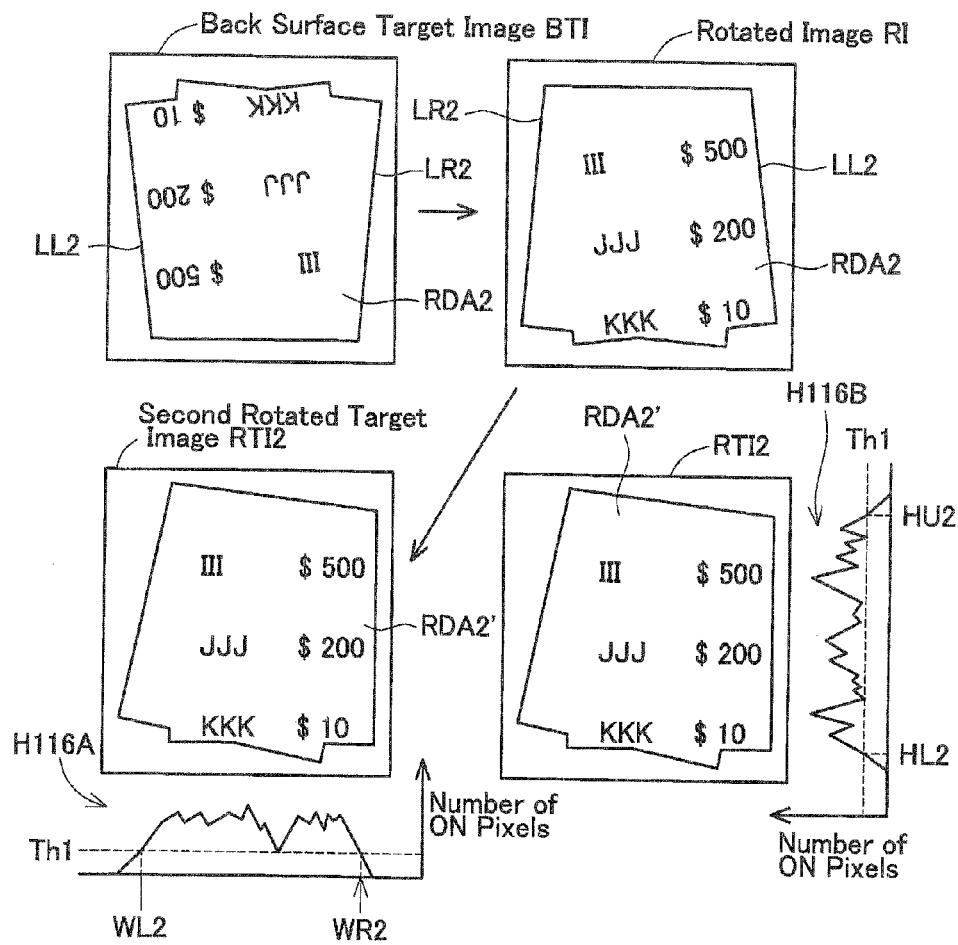
FIG. 11 shows examples of rotated images and second rotated target images generated in the output process.

(Continuation of Specific Contents of Output Process; FIG. 11)

Next, a continuation of FIG. 10 will be described with reference to FIG. 11. In S110 of FIG. 9, the CPU 22 rotates the back surface target image data representing the back surface target image BTI by 180 degrees, generating the rotated image data representing a rotated image RI.

As described above, in the example of FIG. 8, the straight line LR1 corresponding to the edge ER (see FIG. 2) of the receipt document RD is selected as the straight line of back surface. Then, in the rotated image RI, since the straight line LL2 corresponds to the edge ER (see FIG. 2) of the receipt document RD, the straight line LL2 is the straight line of back surface. Consequently, in S112, the second rotated target image data is generated the second rotated target image data representing a second rotated target image RTI2 obtained by rotating the rotated image RI such that the direction in which the straight line of front surface LL2 extends and the vertical direction match. That is, the second rotated target image data is generated the second rotated target image data representing the second rotated target image RTI2 obtained by rotating the rotated image RI in a clockwise direction with the angle β of FIG. 6 as the rotation angle.

In S116, the CPU 22 generates a projection histogram H116A and a projection histogram H116B by using the back surface binary image data generated in S104. The projection histogram H116A and the projection histogram H116B represent distribution of an appearance frequency of the ON pixel data in a case where the plurality of pixel data configuring the back surface binary image data is projected along the vertical direction, and along the horizontal direction, respectively. Next, by using the same method as FIG. 10, the CPU 22 specifies, in the second rotated target image RTI2, a position WL2 near a left edge of a receipt document area RDA2', a position WR2 near a right edge of the receipt document area RDA2', a position HU2 near an upper edge of the receipt document area RDA2', and a position HL2 near a lower edge of the receipt document area RDA2'.

Next, the CPU 22 determines, as the back surface output target area BOA, an expanded area within the second rotated target image RTI2 in which the direction of upper, lower, left, and right of a rectangle area defined by the specified four positions WL2, WR2, HU2, HL2 have each been expanded by a predetermined size. Thereby, the back surface output target area BOA is determined that includes the entire receipt document area RDA2'. Then, the CPU 22 obtains the back surface partial image data representing the back surface output target area BOA within the second rotated target image data.

Figure 12:
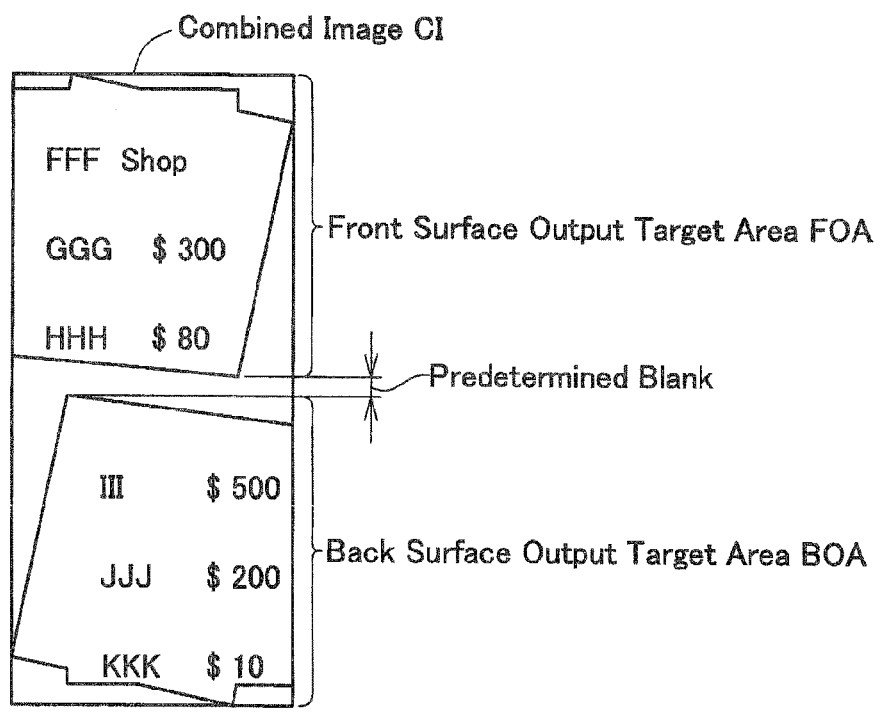
FIG. 12 shows an example of a combined image generated in the output process.

(Continuation of Specific Contents of Output Process; FIG. 12)

Next, a continuation of FIG. 11 will be described with reference to FIG. 12. In S120 of FIG. 9, the CPU 22 combines the front surface partial image data and the back surface partial image data such that the front surface partial image data representing the front surface output target area FOA determined in FIG. 10 is disposed at the upper side, and the back surface partial image data representing the back surface output target area BOA determined in FIG. 11 is disposed at the lower side, generating combined image data representing the combined image CI. At this juncture, the CPU 22 inserts pixel data representing a white blank having a predetermined length between the front surface partial image data and the back surface partial image data. That is, the front surface partial image data and the back surface partial image data are combined via pixel data representing the blank. However, in a variation, the front surface partial image data and the back surface partial image data may be combined not via pixel data representing the blank. Further, the CPU 22 combines the front surface partial image data and the back surface partial image data such that a center position in the horizontal direction of the front surface output target area FOA and a center position in the horizontal direction of the back surface output target area BOA are present at the same position in the horizontal direction of the combined image CL Moreover, in the case where the length (i.e., the number of pixels) in the horizontal direction of the front surface partial image data and the length in the horizontal direction of the back surface partial image data are different, the CPU 22 replenishes the pixel data representing the white blank such that combined image data is generated which represents the combined image CI having a rectangular shape.

(Effect of First Embodiment)

According to the present embodiment, the terminal device TE detects the two straight lines LL1, LR1 within the front surface scan image FSI of FIG. 2 (see FIG. 6), specifies the evaluation value V1 indicating the relationship between the straight line LL1 and the character string object image, and specifies the evaluation value V2 indicating the relationship between the straight line LR1 and the character string object image (see FIG. 8). Then, based on the two evaluation values V1, V2, the terminal device TE selects the straight line LL1 as the straight line of front surface (S80 of FIG. 7). Thereby, based on the direction in which the straight line LL1 extends, the terminal device TE can generate the first rotated target image RTI1 (see FIG. 10) in which the plurality of characters configuring one character string line is arranged along the horizontal direction. Further, the terminal device TE selects the straight line LR1 as the straight line of back surface (S80 of FIG. 7). Thereby, based on the direction in which the straight line LR1 extends, the terminal device TE can generate the second rotated target image RTI2 (see FIG. 11) in which the plurality of characters configuring one character string line is arranged along the horizontal direction. Then, the terminal device TE generates the combined image CI by using these rotated target images RTI1, RTI2. Thus, the terminal device TE can appropriately correct the inclination of the front surface scan image and back surface scan image, and thus can output the appropriate combined image CI.

(First Comparative Example)

A technique of a first comparative example below for correcting the inclination of a document image within a scan image is known. That is, in the technique of the first comparative example, the direction in which the plurality of characters configuring one character string line included in the document image is aligned (i.e., a so-called character string baseline) is detected. Then, the document image is rotated such that the character string baseline extends along the horizontal direction. However, in the technique of the first comparative example, a complicated process is required to detect the character string baseline, and consequently processing time can become long. By contrast, in the present embodiment, the terminal device TE does not need to detect the character string baseline, and consequently can execute processing rapidly. Further, in the technique of the first comparative example, it may not be possible to appropriately detect the baseline in a case where a number of characters configuring one character string line is small, and consequently it may not be possible to appropriately correct the inclination of the document image. By contrast, in the present embodiment, the terminal device TE generates the combined image CI based on the two straight lines LL1, LR1 corresponding to the edges of the receipt document RD, and consequently can output the appropriate combined image CI regardless of the number of characters configuring one character string line.

(Second Comparative Example)

A technique of a second comparative example below for correcting the inclination of a document image within a scan image is known. That is, in the technique of the second comparative example, a binarization process, etc., is executed on the scan image, each unit configuring the document image is represented by the value "1", and each unit configuring the background is represented by the value "0". Next, a line which, from among each string which includes the value "1", has the shortest distance between the value "1" present at the leftmost side and the value "1" present at the rightmost side, and a line in which all the values are "1", are detected. Then, the inclination of the document image is corrected based on the two detected lines. However, in the technique of the second comparative example, the document image is assumed to have a rectangular shape. Consequently, it is possible that the inclination of the document image is not corrected appropriately in e.g., a situation where the receipt document area RDA1 does not have a rectangular shape, as in the front surface scan image FSI of FIG. 2. By contrast, in the present embodiment, the terminal device TE generates the combined image CI based on the two straight lines LL1, LR1 corresponding to the edges of the receipt document RD, and consequently can output the appropriate combined image CI even if the receipt document area RDA1 does not have a rectangular shape.

(Correspondence Relationship)

The terminal device TE is an example of "image processing device". In FIG. 2, the front surface scan image FSI and the back surface scan image BSI are examples of "first original image" and "second original image", respectively. The character string object image included in the front surface scan image FSI, and the character string object image included in the back surface scan image BSI are examples of "first object image" and "second object image", respectively. In the receipt document RD, the three character string lines of the first half "FFF Shop" to "HHH $80", and the three character string lines of the second half "III $500" to "KKK $10" are examples of "first partial object" and "second partial object", respectively. The straight lines LL1, LR1 in the front surface scan image FSI are examples of "two or more straight lines". The straight line LL1 is an example of "first straight line" and "particular straight line". The straight line LR1 is an example of "second straight line" and "straight line different from the particular straight line".

In FIG. 6, the detection image data representing the detection image FDI is an example of "second target image data". The left side divided image LDI and the right side divided image RDI are examples of "first partial image" and "second partial image", respectively.

In FIG. 8, the evaluation value V1 and the evaluation value V2 are examples of a value indicating "first relationship" and a value indicating "second relationship", respectively. The binary image data representing the binary image BI is an example of "first target image data". The pixel data representing the deleted image DI in the plurality of pixel data configuring the binary image data is an example of "K pieces of target pixel data". The ON pixel data in the binary image data is an example of "high-intensity pixel data". The OFF pixel data in the binary image data is an example of "low-intensity pixel data". In the binary image BI of FIG. 8, the horizontal direction, the projection histogram H62, and the threshold value Th2 are examples of "predetermined first direction", "second projection histogram" and "second threshold", respectively. Further, in the first rotated binary image RBI1, the vertical direction, the projection histogram H66, and the threshold value Th3 are examples of "predetermined second direction", "first projection histogram" and "first threshold", respectively. The angle α is an example of "difference angle".

In FIG. 10, the first rotated target image RTI1 is an example of "rotated image". The front surface output target area FOA is an example of "output area" and "first output target area". The front surface partial image data representing the front surface output target area FOA is an example of "removed image data". In FIG. 11, the back surface output target area BOA is an example of "second output target area". In FIG. 12, the combined image CI is an example of "output image".

(Second Embodiment; FIG. 13)

In the present embodiment, the process of S120 of FIG. 9 is different from the first embodiment. As shown in FIG. 13, the CPU 22 generates a projection histogram H120 by using the binary image data generated in S34 of FIG. 3. The projection histogram H120 represents distribution of an appearance frequency of the ON pixel data in a case where the plurality of pixel data configuring the binary image data is projected along the horizontal direction. Next, the CPU 22 specifies a position HL showing an initial occurrence of a frequency equal to or greater than the threshold value Th1 while proceeding from a lower edge toward an upper side of the projection histogram H120. Then, the CPU 22 specifies a length RW (i.e., number of pixels RW) between the position HL on the straight line LL1 and the position HL on the straight line LR1, within the binary image BI. Strictly speaking, the length RW corresponds to a slightly greater length than a length of a short side of the receipt document RD. However, the length RW corresponds to a length approximately equal to the length of the short side of the receipt document RD. Consequently, the length RW is a length related to the length of the short side of the receipt document RD.

Next, the CPU 22 specifies, in the front surface output target area FOA represented by the front surface partial image data obtained in S106 of FIG. 9, a position advanced by the length RW in the right direction from the straight line LL1. Then, the CPU 22 removes, from the plurality of pixel data configuring the front surface partial image data, the pixel data configuring the area at the right side of the specified position in the front surface output target area FOA. Moreover, in the case where pixel data is present the pixel data configuring the area at the left side of the straight line LL1 in the front surface output target area FOA, the CPU 22 also removes the pixel data. Thereby, front surface output image data representing a front surface output image is generated, the front surface output image having a smaller size than the front surface output target area FOA; more specifically, having a size such that length along the horizontal direction is RW.

Next, the CPU 22 specifies, in the back surface output target area BOA represented by the back surface partial image data obtained in S116 of FIG. 9, a position advanced by the length RW in the left direction from the straight line LL2. Then, the CPU 22 removes, from the plurality of pixel data configuring the back surface partial image data, the pixel data configuring the area at the left side of the specified position in the back surface output target area BOA. Moreover, in the case where pixel data is present that configures the area at the right side of the straight line LL2 in the back surface output target area BOA, the CPU 22 also removes that pixel data. Thereby, back surface output image data representing a back surface output image is generated, the back surface output image having a smaller size than the back surface output target area BOA; more specifically, having a size such that length along the horizontal direction is RW.

Next, the CPU 22 combines the front surface output image data and the back surface output image data, via the pixel data representing the blank, such that the front surface output image data is disposed at the upper side, and the back surface output image data is disposed at the lower side, generating combined image data representing the combined image CI. At this juncture, the CPU 22 combines the front surface output image data and the back surface output image data such that the leftmost side pixel data configuring the front surface output image data, and the leftmost side pixel data configuring the back surface output image data, are present at the same position in the horizontal direction. Thereby, the combined image data is generated, the combined image data representing the combined image CI having a size in which the length along the horizontal direction is RW.

(Effect of Second Embodiment)

In the first embodiment, as shown in FIG. 12, the aspect ratio of the combined image CI may differ significantly from the aspect ratio of the receipt document RD. Further, in the horizontal direction of the combined image CI, a left edge position of the three character string lines of the first half may differ significantly from a left edge position of the three character string lines of the second half. That is, layout of the character strings in the combined image CI may differ significantly from the layout of the character strings in the receipt document RD. In contrast, in the present embodiment, the length along the horizontal direction of the combined image CI is the length RW related to the length of the short side of the receipt document RD. Consequently, the combined image CI is output that has an aspect ratio substantially equal to the aspect ratio of the receipt document RD. Further, in the present embodiment, left edge positions of the character strings substantially match in the horizontal direction of the combined image CI. That is, the layout of the character strings in the combined image CI is substantially equal to the layout of the character strings in the receipt document RD. Thus, according to the present embodiment, it is possible to output the combined image CI in which the receipt document RD is appropriately reflected.

(Variation 1)

In S40 of FIG. 3, the CPU 22 may detect three or more straight lines (e.g., LL1, LR1, a straight line of lower side of the receipt document area RDA1, and the like) in the front surface scan image FSI (see FIG. 2). In this case, in S60, the CPU 22 may calculate three or more evaluation values corresponding to the three or more straight lines. For example, when calculating the evaluation value corresponding to the straight line of lower side, the CPU 22 may generate rotated binary image data such that the direction in which the straight line of lower side extends in the binary image BI of FIG. 8 matches the horizontal direction, and calculate the evaluation value by using the rotated binary image data. Then, in S78 to S82 of FIG. 7, the CPU 22 may select, as the straight line of front surface, a straight line corresponding to the maximum evaluation value in the three or more evaluation values.

(Variation 2)

In S80 of FIG. 7, the CPU 22 may select, as the straight line of front surface, two straight lines in the front surface scan image FSI, the two straight lines being the straight line LL1 and a straight line substantially orthogonal to the straight line LL1 (called "sub-straight line" below). Then, the CPU 22, e.g., may correct the direction in which the straight line LL1 extends based on the direction in which the sub-straight line extends, determine a corrected straight line orthogonal to the sub-straight line, and generate the combined image data based on the direction in which the corrected straight line extends. In the present variation, the two straight lines is an example of "particular straight line". That is, "particular straight line" may be one or more straight lines.

(Variation 3)

S48 and S50 of FIG. 4 may be omitted. In this case, the CPU 22 may execute Hough converting on all the detection image data generated in S46, and detect the longest straight line and the second longest straight line in the detection image FDI (see FIG. 6).

(Variation 4)

The processes S74 and S76 of FIG. 7 may be omitted. In this case, the CPU 22 may execute the following processes instead of S78 to S82. That is, in the case where the evaluation value V1 is equal to or above the predetermined threshold, the CPU 22 selects the one straight line LL1, of the two straight lines LL1, LR1, as the straight line of front surface (i.e., selects the other straight line LR1 as the straight line of back surface) and, in the case where the evaluation value V1 is less than the predetermined threshold, selects the other straight line LR1, of the two straight lines LL1, LR1, as the straight line of front surface (i.e., selects the one straight line LL1 as the straight line of back surface).

(Variation 5)

In S66 of FIG. 7, the CPU 22 may calculate, as the evaluation value V1, a total number of high-frequency projection lines in the projection histogram H66 (see FIG. 8), the high-frequency projection lines being those in which the appearance frequency of the ON pixel data is equal to or above the threshold value Th3. Similarly, in S76, the CPU 22 may calculate, as the evaluation value V2, a total number of high-frequency projection lines in the projection histogram H76 (see FIG. 8), the high-frequency projection lines being those in which the appearance frequency of the ON pixel data is equal to or above the threshold value Th3. In this case, the CPU 22 may proceed to S80 instead of S78 in the case where the evaluation value V1 is less than the evaluation value V2, and may proceed to S82 in the case where the evaluation value V1 is equal to or above the evaluation value V2. The evaluation value V1 and the evaluation value V2 of the present variation are examples of value indicating "first relationship" and value indicating "second relationship", respectively.

(Variation 6)

The process S62 of FIG. 7 may be omitted. In this case, in S64 the CPU 22 may generate the first rotated binary image data representing the first rotated binary image obtained by rotating the entire binary image BI of FIG. 8, and in S74 may generate the second rotated binary image data obtained by rotating the entire binary image BI. Then, the CPU 22 may execute any of the following processes of (Variation 6-1) and (Variation 6-2).

(Variation 6-1)

The CPU 22 may project only the pixel data of a part of the plurality of pixel data configuring the first rotated binary image data (e.g., only a central part having a high likelihood of a character being present, only a left half, only a right half, only an upper half, only a lower half, and the like), generate a projection histogram, and calculate the evaluation value V1 by using the projection histogram. Similarly, the CPU 22 may project only the pixel data of a part of the plurality of pixel data configuring the second rotated binary image data, generate a projection histogram, and calculate the evaluation value V2 by using the projection histogram.

(Variation 6-2)

The CPU 22 may project all of the plurality of pixel data configuring the first rotated binary image data, generate a projection histogram, and calculate the evaluation value V1 by using the projection histogram. Further, the CPU 22 may project all of the plurality of pixel data configuring the second rotated binary image data, generate a projection histogram, and calculate the evaluation value V2 by using the projection histogram.

(Variation 7)

The CPU 22 may execute the following process instead of the evaluation value calculating process of S60 of FIG. 3 (i.e., the process of FIG. 7). That is, the CPU 22 may specify e.g., the direction in which the plurality of characters configuring one character string line are aligned within the binary image BI of FIG. 8 (i.e., the direction in which the character string baseline extends), and specify a first angle between that direction and the straight line LL1, and a second angle between that direction and the straight line LR1. In this case, the CPU 22 may select, of the first angle and the second angle, the one straight line LL1 corresponding to an angle close to 90 degrees as the straight line of front surface, and select the other straight line LR1 as the straight line of back surface. In the present variation, the first angle and the second angle are examples of a value indicating "first relationship" and a value indicating "second relationship", respectively.

(Variation 8)

In the above embodiments, in S100 of FIG. 3, the CPU 22 generates the combined image data representing the combined image CI (see FIG. 12), and displays the combined image CI on the display unit 14. Instead, the CPU 22 may execute OCR (abbreviation of Optical Character Recognition) analysis on the combined image data, generate text data, and display the text data on the display unit 14. In the present variation, the text data is an example of "output data".

(Variation 9)

In (variation 8) above, the CPU 22 does not need to generate the first rotated target image data, the second rotated image data, and the combined image data. In this case, the CPU 22 may execute OCR analysis along the direction orthogonal to the straight line LL1 on the front surface scan image data representing the front surface scan image FSI of FIG. 2, and generate text data. Further, the CPU 22 may execute OCR analysis along the direction orthogonal to the straight line LL2 on the back surface scan image data representing the back surface scan image BSI, and generate text data. Then, the CPU 22 may display the two pieces of text data on the display unit 14.

(Variation 10)

In the above embodiments, the CPU 22 obtains (S10 of FIG. 3) two pieces of scan image data (i.e., the front surface scan image data and the back surface scan image data) obtained by scanning the folded receipt document RD. Instead, the CPU 22 may e.g., obtain one piece of scan image data representing one scan image obtained by scanning a book while the book is in an opened state. In this case, two straight lines configuring edges of the document area in the scan image may not have an orthogonal relationship and parallel relationship, but may face each other. In other words, the two straight lines do not intersect each other while not being orthogonal nor parallel to each other. Then, based on two evaluation values corresponding to the two straight lines, the CPU 22 may select one straight line orthogonal to the direction in which the plurality of characters configuring one character string line included in the document area in the scan image are aligned, and rotate the scan image based on the direction in which that straight line extends.

(Variation 11)

The CPU 22 may execute the following processes in order to generate the combined image data representing the combined image CI of the second embodiment. The point of calculating the length RW is the same as the second embodiment. The CPU 22 specifies, in the front surface output target area FOA, a reference position advanced in the right direction from the straight line LL1 by the length RW. Then, the CPU 22 combines the front surface partial image data and the back surface partial image data such that the reference position and the straight line LL2 in the back surface output target area BOA are present in the same position in the horizontal direction, generating middle combined image data. Next, from the plurality of pixel data configuring the middle combined image data, the CPU 22 removes the pixel data that configures the area at the left side of the straight line LL1 and removes the pixel data that configures the area at the right side of the straight line LL2, generating the combined image data representing the combined image CL Moreover, instead of specifying the reference position based on the straight line LL1, the CPU 22 may specify a reference position in the back surface output target area BOA that is advanced by the length RW in the left direction from the straight line LL2. Then, the CPU 22 combines the front surface partial image data and the back surface partial image data such that the reference position and the straight line LL1 in the front surface output target area FOA are present at the same position in the horizontal direction, generating the middle combined image data.

(Variation 12)

After S40 of FIG. 3 has ended, the CPU 22 may execute the following processes before executing S60. That is, for each of the two or more straight lines detected in S40, the CPU 22 executes S102 to SI 20 of FIG. 9 based on the direction in which the straight lines extend. That is, the CPU 22 generates two or more pieces of combined image data corresponding to the two or more straight lines. Then, the CPU 22 executes S60, selecting one straight line from among the two or more straight lines. Then, the CPU 22 specifies one piece of combined image data corresponding to the selected one straight line from among the two or more pieces of combined image data that were generated, and outputs a combined image represented by the specified combined image data. In the present variation, also, it is possible to output an appropriate combined image. Moreover, CPU22 may output the combined image represented by the combined image data, before executing S60.

(Variation 13)

The CPU 22 may not display the combined image CI, and may send the combined image data to a printer, and cause the printer to print the combined image CI. Moreover, the printer may be, e.g., the scanner SC (i.e., the scanner SC may be a multi-function device comprising a scan function and a print function), or may be a printer configured separately from the scanner SC. In the present variation, the combined image data that is the print target is an example of "output data". That is, the term "output" does not include only displaying, but also printing.

(Variation 14)

In the above embodiments, the terminal device TE executes the processes of FIG. 3 to FIG. 13. Instead, the scanner SC may execute the processes of FIG. 3 to FIG. 13, and may cause the combined image CI to be displayed on a display unit (not shown) of the scanner SC or on the display unit 14 of the terminal device TE. In the present variation, the scanner SC is an example of "image processing device".

(Variation 15)

In the above embodiments, the processes of FIG. 3 to FIG. 13 are realized by the CPU 22 of the terminal device TE executing the driver program 26 (i.e., software). Instead, at least one of the processes of FIG. 3 to FIG. 13 may be realized by hardware such as a logic circuit.

What is claimed is:

1. A non-transitory computer-readable recording medium storing computer-readable instructions for an image processing device, the computer-readable instructions, when executed by a processor of the image processing device, causing the image processing device to perform:

obtaining first original image data generated by scanning a document including an object, the first original image data representing a first original image which includes a first object image indicating the object;

detecting two or more straight lines in the first original image;

specifying a first relationship between a first straight line among the two or more straight lines and the first object image;

selecting, based on the first relationship, a particular straight line among the two or more straight lines; and generating, based on a direction in which the particular straight line extends, output data by using the first original image data, wherein the generating of the output data is performed by:

generating rotated image data representing a rotated image, the rotated image being an image in which the first original image is rotated by a rotation angle, the rotation angle being determined based on the direction in which the particular straight line extends; and generating the output data by using the rotated image data.

2. The non-transitory computer-readable recording medium as in claim 1, wherein the computer-readable instructions, when executed by the processor, cause the image processing device to further perform:

specifying a second relationship between a second straight line among the two or more straight lines and the first object image, the second straight line being different from the first straight line, wherein the particular straight line is selected based on the first relationship and the second relationship.

3. The non-transitory computer-readable recording medium as in claim 1, wherein
the first original image data includes object pixel data representing the first object image and background pixel data representing a background of the first object image, and
wherein the computer-readable instructions, when executed by the processor, cause the image processing device to further perform:
generating a first projection histogram by projecting K pieces (the K being an integer of 2or more) of target pixel data along a direction orthogonal to the first straight line, the K pieces of target pixel data being included in a plurality of target pixel data configuring first target image data, the first target image data being obtained by using the first original image data, the first projection histogram representing a distribution of an appearance frequency of related target pixel data which is related to the object pixel data,
wherein the first relationship is specified by using the first projection histogram.

4. The non-transitory computer-readable recording medium as in claim 3, wherein
the computer-readable instructions, when executed by the processor, cause the image processing device to further perform:
generating the first target image data by converting a plurality of original pixel data configuring the first original image data, the first target image data including high-intensity pixel data and low-intensity pixel data, the high-intensity pixel data having an edge intensity higher than a predetermined threshold, the low-intensity pixel data having an edge intensity equal to or lower than the predetermined threshold,
wherein the related target pixel data is the high-intensity pixel data.

5. The non-transitory computer-readable recording medium as in claim 3, wherein
the first relationship is a number of target projection lines among all projection lines used in generating the first projection histogram, the target projection lines being projection lines in which the appearance frequency of the related target image data is equal to or less than a first threshold.

6. The non-transitory computer-readable recording medium as in claim 3, wherein
the K pieces of target pixel data are a part of the plurality of target pixel data configuring the first target image data.

7. The non-transitory computer-readable recording medium as in claim 6, wherein
the computer-readable instructions, when executed by the processor, cause the image processing device to further perform:
generating the first target image data by converting a plurality of original pixel data configuring the first original image data, the first target image data including high-intensity pixel data and low-intensity pixel data, the high-intensity pixel data having an edge intensity higher than a predetermined threshold, the low-intensity pixel data having an edge intensity equal to or lower than the predetermined threshold,
wherein the related target pixel data is the high-intensity pixel data,
the computer-readable instructions, when executed by the processor, cause the image processing device to further perform:

generating a second projection histogram by projecting, along a predetermined first direction, the plurality of target pixel data configuring the first target image data, the second projection histogram representing a distribution of an appearance frequency of the high-intensity pixel data,
wherein the generating of the first projection histogram is performed by:
specifying, by using the second projection histogram, one or more target pixel data from among the plurality of target pixel data configuring the first target image data, the one or more target pixel data being target pixel data on a projecting line in which the appearance frequency of the high-intensity pixel data is equal to or less than a second threshold;
specifying the K pieces of target pixel data by removing the specified one or more target pixel data from the plurality of target pixel data configuring the first target image data; and
generating the first projection histogram by projecting the specified K pieces of target pixel data along the direction orthogonal to the first straight line.

8. The non-transitory computer-readable recording medium as in claim 1, wherein
the detecting of the two or more straight lines is performed by:
detecting the first straight line among the two or more straight lines from a first partial image represented by first partial image data, the first partial image data being a part of second target image data, the second target image data being obtained by using the first original image data; and
detecting a second straight line among the two or more straight lines from a second partial image represented by second partial image data, the second straight line being different from the first straight line, the second partial image data being a part of the second target image data and being different from the first partial image data.

9. The non-transitory computer-readable recording medium as in claim 8, wherein
the detecting of the first straight line is performed by detecting the longest straight line included in the first partial image, and
the detecting of the second straight line is performed by detecting the longest straight line included in the second partial image.

10. The non-transitory computer-readable recording medium as in claim 1, wherein
the detecting of the two or more straight lines is performed by detecting two straight lines which are the longest straight line included in the first original image and the second longest straight line included in the first original image,
wherein the two straight lines do not intersect each other while not being orthogonal nor parallel to each other.

11. The non-transitory computer-readable recording medium as in claim 1, wherein
the detecting of the two or more straight lines is performed by detecting two straight lines corresponding to edges of a document area among the first original image, the document area indicating the document,
wherein the two straight lines do not intersect each other while not being orthogonal nor parallel to each other.

12. The non-transitory computer-readable recording medium as in claim 1, wherein the first relationship is a relationship of an orientation of the first object image when the first original image is rotated by a difference angle as a rotation angle, the difference angle being an angle between the direction in which the first straight line extends and a predetermined second direction.

13. The non-transitory computer-readable recording medium as in claim 1, wherein
   the first object image indicates the object including one or more character string lines,
   the first relationship is a relationship of an angle between the direction in which the first straight line extends and a direction in which a plurality of characters is aligned, the plurality of characters configuring one character string line among the one or more character string lines indicated by the first object image, and
   the particular straight line is a straight line being orthogonal to the direction in which the plurality of characters is aligned.

14. The non-transitory computer-readable recording medium as in claim 1, wherein
   the generating of the output data is performed by:
      determining, by using the rotated image data, an output area from among the rotated image, the output area including a document area indicating the document;
      generating, by using the rotated image data, removed image data representing a removed image, the removed image being an image in which an area other than the output area is removed from the rotated image; and
      generating the output data by using the removed image data.

15. The non-transitory computer-readable recording medium as in claim 1, wherein
   the generating of the output data is performed by:
      determining a specifc length in the first original image, the specifc length being related to a length of a specific side in the document having a rectangular shape;
      determining a first output target area which is a partial area in the first original image, the first output target area having the specifc length along a direction orthogonal to the particular straight line; and
      generating the output data based on the first output target area.

16. The non-transitory computer-readable recording medium as in claim 1, wherein
   the first original image includes the first object image indicating a first partial object which is a part of the object,
   the computer-readable instructions, when executed by the processor, cause the image processing device to further perform:
   obtaining second original image data generated by scanning the document, the second original image data representing a second original image which includes a second object image, the second object image indicating a second partial object which is a part of the object, the second partial object being different from the first partial object,
   wherein the generating of the output data is performed by:
      using the first original image data based on the direction in which the particular straight line extends; and
      using the second original image data based on a direction in which a straight line different from the particular straight line among the two or more straight lines extends.

17. The non-transitory computer-readable recording medium as in claim 16, wherein
   the output data represents an output image including a combined area, the combined area being obtained by combining a first output target area in the first original image and a second output target area in the second original image.

18. The non-transitory computer-readable recording medium as in claim 16, wherein
   in a case where a first partial area of the document and a second partial area of the document are separately scanned, under a state in which the document is folded at a boundary between the first partial area and the second partial area, the first partial area including the first partial object, the second partial area including the second partial object:
      the first original image includes the first object image indicating the first partial object; and
      the second original image includes the second object image indicating the second partial object.

19. A non-transitory computer-readable recording medium storing computer-readable instructions for an image processing device,
   the computer-readable instructions, when executed by a processor of the image processing device, causing the image processing device to perform:
   obtaining first original image data generated by scanning a document including an object, the first original image data representing a first original image which includes a first object image indicating the object;
   detecting two straight lines corresponding to edges of a document area among the first original image, the document area indicating the document, wherein the two straight lines do not intersect each other while not being orthogonal nor parallel to each other;
   specifying a first relationship between a first straight line among the two straight lines and the first object image;
   selecting, based on the first relationship, a particular straight line among the two straight lines; and
   generating, based on a direction in which the particular straight line extends, output data by using the first original image data.

20. A non-transitory computer-readable recording medium storing computer-readable instructions for an image processing device,
   the computer-readable instructions, when executed by a processor of the image processing device, causing the image processing device to perform:
   obtaining first original image data generated by scanning a document including an object, the first original image data representing a first original image which includes a first object image indicating the object;
   detecting two or more straight lines in the first original image;
   specifying a first relationship between a first straight line among the two or more straight lines and the first object image, the first relationship being a relationship of an orientation of the first object image when the first original image is rotated by a difference angle as a rotation angle, the difference angle being an angle between the direction in which the first straight line extends and a predetermined second direction;
   selecting, based on the first relationship, a particular straight line among the two or more straight lines; and generating, based on a direction in which the particular straight line extends, output data by using the first original image data.

\* \* \* \* \*